US012646225B2

(12) United States Patent
Horvath et al.

(10) Patent No.: US 12,646,225 B2
(45) Date of Patent: Jun. 2, 2026

(54) IMAGE COMPRESSION USING TENSOR-PRODUCT B-SPLINE REPRESENTATION

(71) Applicant: DOLBY LABORATORIES LICENSING CORPORATION

(72) Inventors: Janos Horvath, Santa Clara, CA (US); Guan-Ming Su, Fremont, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 19/153,856

(22) PCT Filed: Feb. 5, 2024

(86) PCT No.: PCT/US2024/014488
§ 371 (c)(1),
(2) Date: Aug. 5, 2025

(87) PCT Pub. No.: WO2024/167857
PCT Pub. Date: Aug. 15, 2024

(65) Prior Publication Data
US 2026/0112065 A1 Apr. 23, 2026

Related U.S. Application Data

(60) Provisional application No. 63/484,329, filed on Feb. 10, 2023.

(30) Foreign Application Priority Data

Apr. 12, 2023 (EP) ..................................... 23167592

(51) Int. Cl.
*G06T 9/00* (2006.01)
(52) U.S. Cl.
CPC .................................... *G06T 9/001* (2013.01)

(58) Field of Classification Search
CPC ....... G06T 9/001; H04N 19/597; H04N 19/50
See application file for complete search history.

(56) References Cited

U.S. PATENT DOCUMENTS 11,962,760 B2 4/2024 Su
12,244,872 B2 3/2025 Horvath
(Continued)

FOREIGN PATENT DOCUMENTS

EP 4399874 B1 7/2025
WO 2022103902 A1 5/2022
(Continued)

OTHER PUBLICATIONS

Emilien Dupont at al, "COIN: Compression with Implicit Neural representations," ICLR 2021 Neural Compression Workshop, Apr. 10, 2021, 12 pages.

*Primary Examiner* — Tung T Vo

(57) ABSTRACT

Methods and apparatus for image compression/decompression using tensor product B-spline (TPB) representations. According to an example embodiment, an image-compression method includes generating a plurality of TPB models representing an image, including a TPB model for approximating a spatial reshaping function and a plurality of patch-wise TPB models for estimating the image signal. In some examples, the plurality of patch-wise TPB models includes a plurality of luma-channel TPB models and a plurality of chroma-channel TPB models. The spatial reshaping function is configured to shift a non-uniform distribution of local content complexity in the image toward being more uniform. The method also includes generating a metadata stream carrying metadata representing sets of coefficients of various TPB models. At least a portion of the metadata is generated by quantizing the corresponding coefficients to a smaller number of bits and applying arithmetic coding to the quantized coefficients.

28 Claims, 10 Drawing Sheets

(56) References Cited

U.S. PATENT DOCUMENTS

| | | | | |
|---|---|---|---|---|
| 2022/0408081 A1* | 12/2022 | Su | | H04N 19/463 |
| 2023/0007294 A1* | 1/2023 | Kadu | | H04N 19/109 |
| 2023/0164366 A1* | 5/2023 | Su | | H04N 19/98 |
| | | | | 375/240.01 |
| 2024/0007682 A1* | 1/2024 | Horvath | | H04N 19/192 |
| 2024/0171775 A1* | 5/2024 | Su | | H04N 19/20 |

FOREIGN PATENT DOCUMENTS

| | | | |
|---|---|---|---|
| WO | 2022245695 A1 | 11/2022 |
| WO | 2022260902 A1 | 12/2022 |
| WO | 2024091969 A1 | 5/2024 |
| WO | 2024173649 A1 | 8/2024 |

* cited by examiner

IMAGE COMPRESSION USING TENSOR-PRODUCT B-SPLINE REPRESENTATION

1. CROSS-REFERENCE TO RELATED APPLICATIONS

This application is the U.S. National stage entry of Internation Patent Application No. PCT/US2024/014488 filed Feb. 5, 2024, which claims the benefit of priority from U.S. Provisional Application Ser. No. 63/484,329 filed on Feb. 10, 2023, and European Patent Application No. EP 23167592.7 filed on 12 Apr. 2023, each one incorporated by reference.

2. FIELD OF THE DISCLOSURE

Various example embodiments relate to handling images and, more specifically but not exclusively, to image compression.

3. BACKGROUND

Image compression is a process applied to an image file with the purpose of reducing the file size in bytes without degrading the image quality to a level below a selected quality threshold. By reducing the file size, more images can be stored in a given memory volume. The compressed images also take less bandwidth to transmit over a communication channel, thereby beneficially reducing network congestion and speeding up content delivery.

BRIEF SUMMARY OF SOME SPECIFIC EMBODIMENTS

Disclosed herein are various embodiments of methods and apparatus for image compression/decompression using tensor product B-spline (TPB) representations. According to an example embodiment, an image-compression method includes generating a plurality of TPB models representing an image, including a TPB model for approximating a spatial reshaping function and a plurality of patch-wise TPB models for estimating the image signal. In some examples, the plurality of patch-wise TPB models includes a plurality of luma-channel TPB models and a plurality of chroma-channel TPB models. The spatial reshaping function is configured to shift a non-uniform distribution of local content complexity in the image toward being more uniform. The method also includes generating a metadata stream carrying metadata representing sets of coefficients of various TPB models. At least a portion of the metadata is generated by quantizing the corresponding coefficients to a smaller number of bits and applying arithmetic coding to the quantized coefficients.

According to an example embodiment, provided is an image-compression method, comprising: generating, with an electronic encoder, a first TPB model representing an image, the first TPB model approximating a spatial reshaping function configured to map uniformly sampled locations within the image to non-uniformly spaced positions; generating, with the electronic encoder, a plurality of second TPB models, each of the second TPB models representing a respective patch of the image and configured to estimate an image signal within the respective patch as a function of reshaped coordinate, the reshaped coordinate being determined using the spatial reshaping function; and generating, with the electronic encoder, a metadata stream including first metadata representing a set of coefficients of the first TPB model and second metadata representing sets of coefficients of the plurality of second TPB models.

According to another example embodiment, provided is an apparatus for image compression, the apparatus comprising: at least one processor; and at least one memory including program code, wherein the at least one memory and the program code are configured to, with the at least one processor, cause the apparatus at least to: generate a first TPB model representing an image, the first TPB model approximating a spatial reshaping function configured to map uniformly sampled locations within the image to non-uniformly spaced positions; generate a plurality of second TPB models, each of the second TPB models representing a respective patch of the image and configured to estimate an image signal within the respective patch as a function of reshaped coordinate, the reshaped coordinate being determined using the spatial reshaping function; and generate a metadata stream including first metadata representing a set of coefficients of the first TPB model and second metadata representing sets of coefficients of the plurality of second TPB models.

According to yet another example embodiment, provided is a non-transitory computer-readable medium storing instructions that, when executed by an electronic processor, cause the electronic processor to perform operations comprising an image-compression method that includes: generating, with an electronic encoder, a first TPB model representing an image, the first TPB model approximating a spatial reshaping function configured to map uniformly sampled locations within the image to non-uniformly spaced positions; generating, with the electronic encoder, a plurality of second TPB models, each of the second TPB models representing a respective patch of the image and configured to estimate an image signal within the respective patch as a function of reshaped coordinate, the reshaped coordinate being determined using the spatial reshaping function; and generating, with the electronic encoder, a metadata stream including first metadata representing a set of coefficients of the first TPB model and second metadata representing sets of coefficients of the plurality of second TPB models.

According to yet another example embodiment, provided is an image-decompression method, comprising: receiving, with an electronic decoder, a metadata stream including first metadata representing a set of coefficients of a first TPB model and second metadata representing sets of coefficients of a plurality of second TPB models, the first TPB model approximating a spatial reshaping function configured to map uniformly sampled locations within a source image to non-uniformly spaced positions, each of the second TPB models representing a respective patch of the source image and configured to estimate an image signal within the respective patch as a function of reshaped coordinate, the reshaped coordinate being determined based on the spatial reshaping function; generating, with the electronic decoder, a plurality of reconstructed image patches based on the first TPB model and further based on the plurality of second TPB models, the first TPB model being reconstructed using the first metadata, the plurality of second TPB models being reconstructed using the second metadata; and constructing, with the electronic decoder, an estimated image by assembling the plurality of reconstructed image patches in an image frame.

According to yet another example embodiment, provided is an apparatus for image decompression, the apparatus comprising: at least one processor; and at least one memory including program code, wherein the at least one memory and the program code are configured to, with the at least one processor, cause the apparatus at least to: receive a metadata stream including first metadata representing a set of coefficients of a first TPB model and second metadata representing sets of coefficients of a plurality of second TPB models, the first TPB model approximating a spatial reshaping function configured to map uniformly sampled locations within a source image to non-uniformly spaced positions, each of the second TPB models representing a respective patch of the source image and configured to estimate an image signal within the respective patch as a function of reshaped coordinate, the reshaped coordinate being determined using the spatial reshaping function; generate a plurality of reconstructed image patches based on the first TPB model and further based on the plurality of second TPB models, the first TPB model being reconstructed using the first metadata, the plurality of second TPB models being reconstructed using the second metadata; and construct an estimated image by assembling the plurality of reconstructed image patches in an image frame.

According to yet another example embodiment, provided is a non-transitory computer-readable medium storing instructions that, when executed by an electronic processor, cause the electronic processor to perform operations comprising an image-decompression method that includes: receiving, with an electronic decoder, a metadata stream including first metadata representing a set of coefficients of a first TPB model and second metadata representing sets of coefficients of a plurality of second TPB models, the first TPB model approximating a spatial reshaping function configured to map uniformly sampled locations within a source image to non-uniformly spaced positions, each of the second TPB models representing a respective patch of the source image and configured to estimate an image signal within the respective patch as a function of reshaped coordinate, the reshaped coordinate being determined based on the spatial reshaping function; generating, with the electronic decoder, a plurality of reconstructed image patches based on the first TPB model and further based on the plurality of second TPB models, the first TPB model being reconstructed using the first metadata, the plurality of second TPB models being reconstructed using the second metadata; and constructing, with the electronic decoder, an estimated image by assembling the plurality of reconstructed image patches in an image frame.

BRIEF DESCRIPTION OF THE DRAWINGS

Other aspects, features, and benefits of various disclosed embodiments will become more fully apparent, by way of example, from the following detailed description and the accompanying drawings, in which.

DETAILED DESCRIPTION

Figure 1:
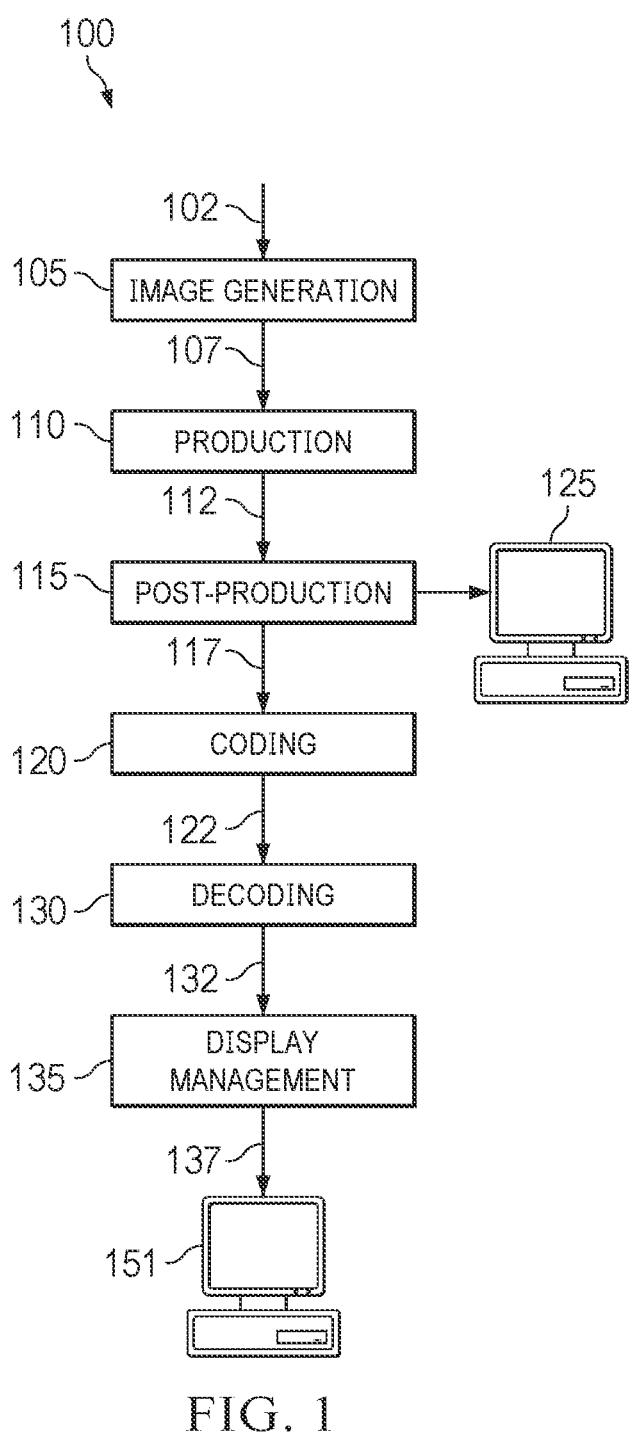
FIG. 1 is a block diagram illustrating an example process for a video/image delivery pipeline.

This disclosure and aspects thereof can be embodied in various forms, including hardware, devices or circuits controlled by computer-implemented methods, computer program products, computer systems and networks, user interfaces, and application programming interfaces; as well as hardware-implemented methods, signal processing circuits, memory arrays, application specific integrated circuits (ASICs), field programmable gate arrays (FPGAs), and the like. The foregoing is intended solely to give a general idea of various aspects of the present disclosure and does not limit the scope of the disclosure in any way.

In the following description, numerous details are set forth, such as optical device configurations, timings, operations, and the like, in order to provide an understanding of one or more aspects of the present disclosure. It will be readily apparent to one skilled in the art that these specific details are merely exemplary and not intended to limit the scope of this application.

Various methods used to compress images typically fall into one of two categories: lossy compression and lossless compression. Lossy compression reduces the image file size by permanently removing some information, which becomes irreversibly lost. A representative example of lossy compression is the JPEG format used extensively on the web and in digital photography. Lossless compression reduces the image file size without removing critical data and results in a compressed image that can be restored to its original state with no degradation or distortion. However, lossless compression does not typically reduce the file size as much as lossy compression. As a result, lossless compression is typically used in situations where image quality is more important than disk space or network performance, such as for product images or showcasing artwork.

As used herein, the term "dynamic range" (DR) may relate to a capability of the human visual system (HVS) to perceive a range of intensity (e.g., luminance, luma) in an image, e.g., from darkest blacks (darks) to brightest whites (highlights). In this sense, DR relates to a "scene-referred" intensity. DR may also relate to the ability of a display device to render, adequately or approximately, an intensity range of a particular breadth. In this sense, DR relates to a "display-referred" intensity. Unless a particular sense is explicitly specified to have particular significance at any point in the description herein, it should be inferred that the term may be used in either sense, e.g., interchangeably.

As used herein, the term "high dynamic range" (HDR) relates to a DR breadth that spans 14-15 or more orders of magnitude of the HVS. In practice, the DR over which a human may simultaneously perceive an extensive breadth in intensity range may be somewhat truncated, in relation to HDR. As used herein, the terms "enhanced dynamic range" (EDR) or "visual dynamic range" (VDR) may individually or interchangeably relate to the DR that is perceivable within a scene or image by a human visual system that includes eye movements, allowing for some light adaptation changes across the scene or image. Herein, EDR may relate to a DR that spans 5 to 6 orders of magnitude. While perhaps somewhat narrower in relation to the true scene-referred HDR, EDR nonetheless represents a wide DR breadth and sometimes may also be referred to as HDR.

In practice, images comprise one or more color components (e.g., luma Y and chroma Cb and Cr) of a color space, where each color component is represented with a precision of n-bits per pixel (e.g., n=8). Using non-linear luminance coding (e.g., gamma encoding), images where n<8 (e.g., 24-bit color JPEG images) are considered images of standard dynamic range (SDR), while images where n>8 may be considered images of EDR.

In the mathematical subfield of numerical analysis, a B-spline or basis spline is a spline function that has minimal support with respect to a given degree, smoothness, and domain partition. Any spline function of a given degree can be expressed as a linear combination of B-splines of that degree. Cardinal B-splines have knots that are equidistant from each other. B-splines can be used, e.g., for curve-fitting and numerical differentiation of experimental data. In computer-aided design and computer graphics, spline functions are constructed as linear combinations of B-splines with a set of control points.

A one-dimensional B-spline can be extended to multiple dimensions through the use of tensor product B-spline (TPB) constructs. Multivariate basis functions are constructed by multiplying B-splines corresponding to the different dimensions. For example, first, a B-spline subspace is defined for each dimension. Thereafter, a tensor product function in the multidimensional space is constructed as a weighted sum of one-dimensional B-spline constructs, with the weights representing the corresponding tensor elements. A brief description of main TPB concepts pertaining to various embodiments disclosed herein is appended at the end of this specification.

Example Video/Image Delivery Pipeline

FIG. 1 is a block diagram illustrating an example process of a video/image delivery pipeline (100) and showing various stages from video/image capture to video/image-content display according to an embodiment. A sequence of video/image frames (102) may be captured or generated using an image-generation block (105). The frames (102) may be digitally captured (e.g., by a digital camera) or generated by a computer (e.g., using computer animation) to provide video and/or image data (107). Alternatively, the frames (102) may be captured on film by a film camera. Then, the film may be translated into a digital format to provide the video/image data (107).

In a production phase (110), the data (107) may be edited to provide a video/image production stream (112). The data of the video/image production stream (112) may be provided to a processor (or one or more processors, such as a central processing unit, CPU) at a post-production block (115) for post-production editing. The post-production editing of the block (115) may include, e.g., adjusting or modifying colors or brightness in particular areas of an image to enhance the image quality or achieve a particular appearance for the image in accordance with the video creator's creative intent. This part of post-production editing is sometimes referred to as "color timing" or "color grading." Other editing (e.g., scene selection and sequencing, image cropping, addition of computer-generated visual special effects, removal of artifacts, etc.) may be performed at the block (115) to yield a "final" version (117) of the production for distribution. During the post-production editing (115), video and/or images may be viewed on a reference display (125).

Following the post-production (115), the data of the final version (117) may be delivered to a coding block (120) for being further delivered downstream to decoding and playback devices, such as television sets, set-top boxes, flat or curved displays, personal computers, mobile devices, head-mounted displays, and the like. In some embodiments, the coding block (120) may include audio and video encoders, such as those defined by the ATSC, DVB, DVD, Blu-Ray, and other delivery formats, to generate a coded bitstream (122). In some examples, an electronic encoder used in the coding block (120) comprises or is implemented using an electronic processor coupled to a memory including program code, wherein the memory and the program code are configured to, with the electronic processor, cause the electronic encoder to perform various coding operations, non-limiting examples of which are described below, e.g., in reference to FIG. 2.

After transmission through a delivery or distribution channel, the coded bitstream (122) is decoded in a decoding block (130) to generate a corresponding decoded signal (132) representing a copy or a close approximation of the signal (117). The decoding block (130) is communicatively connected to a target display (140) that may have somewhat or completely different characteristics than the reference display (125). In such cases, a display management (DM) block (135) may be used to map the decoded signal (132) to the characteristics of the target display (140) by generating a display-mapped signal (137). Depending on the embodiment, the decoding unit (130) and display management block (135) may include individual processors or may be based on a single integrated processing unit. In some examples, an electronic decoder used in the decoding block (130) comprises or is implemented using an electronic processor coupled to a memory including program code, wherein the memory and the program code are configured to, with the electronic processor, cause the electronic decoder to perform various decoding operations, nonlimiting examples of which are described below, e.g., in reference to FIG. 3.

A codec used in the coding block (120) and/or the decoding block (130) enables video/image data processing and compression/decompression. The compression is used in the coding block (120) to make the corresponding file(s) or stream(s) smaller. The decoding process carried out by the decoding block (130) typically includes decompressing the received video/image data file(s) or stream(s) into a form usable for playback and/or further editing. Example coding/decoding operations that can be used in the coding block (120) and the decoding unit (130) according to various embodiments are described in more details below.

Encoder and Decoder Architectures

In some examples, every color pixel in a digital image is created through a respective combination of three primary colors, such as red, green, and blue (RGB). Each primary color is typically referred to as a "color channel" or "color component" and has a range of intensity values specified by its bit depth. The bit depth for each primary color is termed the "number of bits per channel," typically ranging from 8 to 16 bits. The "bits per pixel" (bpp) refers to the sum of the "numbers of bits per color channel," i.e., the total number of bits used to code the color information of the pixel. An example uncompressed RGB image with a bit depth of 8 bits per color has 24 bpp or 24 bits per pixel (which include 8 bits for the red color, 8 bits for the green color, and 8 bits for the blue color). Standard color transforms can be used to convert RGB images to the YCbCr color format, and vice versa.

Some embodiments disclosed herein can be used to compress multimedia, such as color images, using TPB representations. Unlike some conventional compression methods, which work on digitized samples, such as pixels, various embodiments are configured to model images using continuous functions and perform optimization on the function coefficients to explore the inherent image structure and to alleviate redundancy. In some examples, to represent an image, the encoder operates to fit an implicit TPB model with input coordinates to construct a continuous function that maps digitized sampled pixel locations to the corresponding digitized sampled pixel values. The TPB coefficients are compressed via quantization and entropy coding and transmitted to the decoder. The decoder applies decompression to reconstruct the TPB coefficients first, and then operates to query pixel locations with the corresponding TPB function to generate pixel values. In at least some examples, a spatial-domain coordinate-reshaping method is used to enhance the performance. At least some embodiments are beneficially capable of outperforming some conventional image compression techniques, such as the JPEG, at relatively low bit rates, e.g., lower than approximately 0.5 bpp. Furthermore, unlike some representative neural-network-based solutions, a TPB-based solution disclosed herein does not typically rely on iterative computations, such as back propagation, thereby beneficially enabling implementations with lower computation power and smaller memory allocations.

Figure 2:
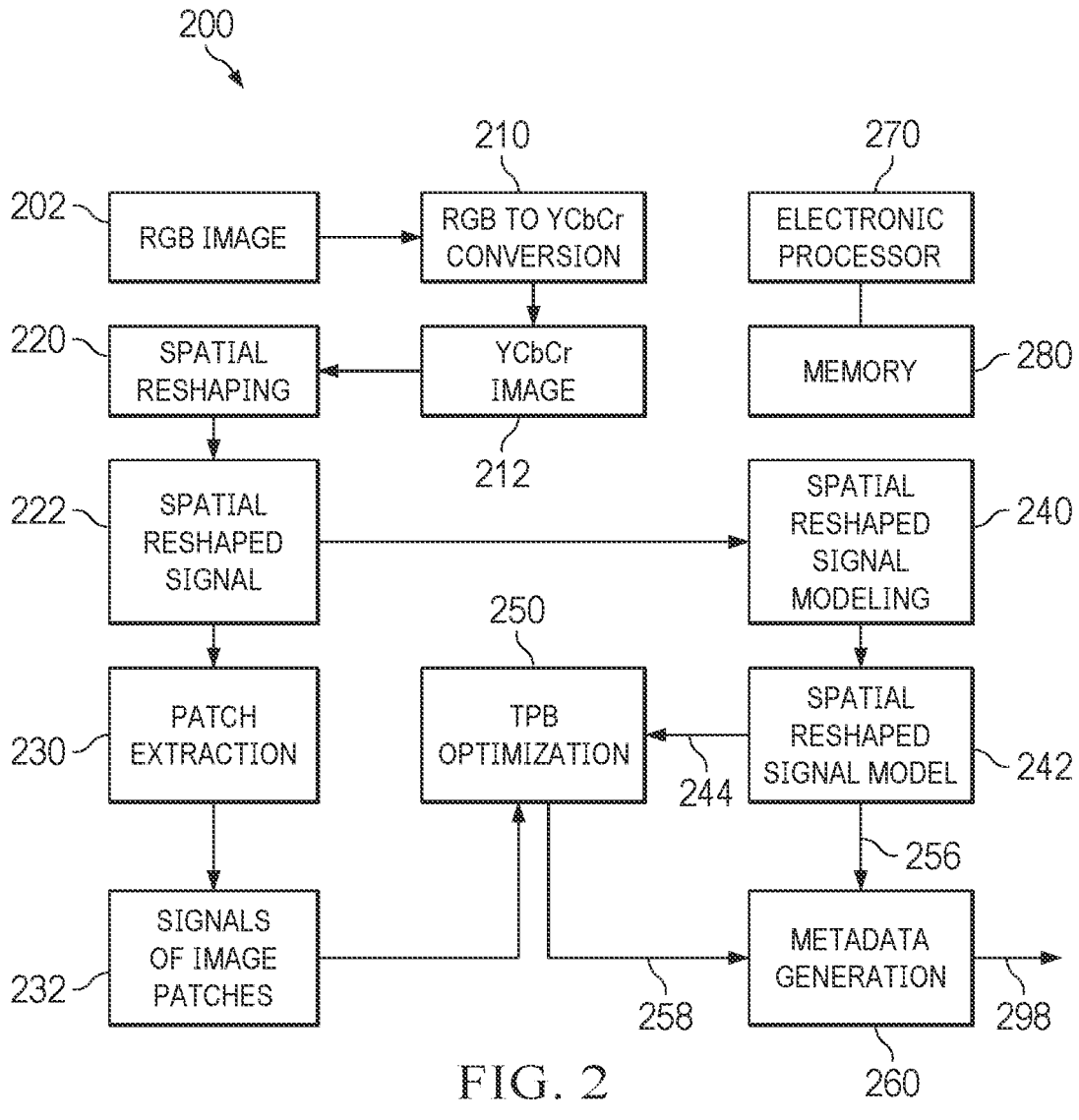
FIG. 2 is a block diagram illustrating an encoder that can be used in the delivery pipeline of FIG. 1 according to an embodiment.

FIG. 2 is a block diagram illustrating an encoder (200) according to an embodiment. Hardware of the encoder (200) includes an electronic processor (270) and a memory (280) operatively coupled to each other. The electronic processor (270) and the memory (280) enable various modules of the encoder (200) to perform various coding operations described below. An example input to the encoder (200) includes an RGB image or images (202). The encoder (200) processes the image(s) (202) to generate a metadata bitstream (298). In some examples, the encoder (200) is used in the coding block (120) of the pipeline (100). The image (202) is a part of the stream (117). The metadata bitstream (298) forms a part of the coded bitstream (122).

In the example shown, main operations of the encoder (200) are performed in the YCbCr color domain. As such, the encoder (200) includes an RGB-to-YCbCr converter (210) configured to convert the input RGB image (202) into a corresponding YCbCr image (212). In some examples, the RGB-to-YCbCr conversion implemented in the RGB-to-YCbCr converter (210) is a straightforward standard operation known to persons of ordinary skill in the pertinent art. In some other examples, operations of the encoder (200) are performed directly in the RGB color domain. In such examples, the RGB-to-YCbCr converter (210) is omitted or bypassed.

In some examples, the YCbCr image (212) generated by RGB-to-YCbCr converter (210) has the YCbCr 4:4:4 format. Since the encoder (200) is configured to use a respective coordinate-based TPB model for each color channel, the chroma subsampling operation is not performed in such examples. Omission of the chroma subsampling operation saves computational power while causing only relatively small adjustments to the coordinate model itself (with fewer parameters than the original size). In other examples, other YCbCr formats, e.g., the YCbCr 4:2:2 or 4:2:0 format, are similarly used. In such other examples, the chroma subsampling operation may be performed.

The encoder (200) implements a patch-based solution wherein each patch is modelled by a different respective implicit TPB function. In a representative example, the encoder (200) operates to partition the image (212) into non-overlapping rectangular patches, e.g., having a patch size of $W^p \times H^p$, where $W^p$ is the patch width, and $H^p$ is the patch height. Each patch of the image (212) is processed in the encoder (200) using the same sequence of operations, e.g., as described in more detail below. Within that sequence, operations of a spatial reshaping module (220) are applied to the whole image (212) whereas modeling and optimization operations of downstream modules (240, 250) are applied to each patch individually.

The spatial reshaping module (220) operates on the YCbCr image (212) to perform spatial domain coordinate reshaping, thereby generating a corresponding spatially reshaped signal (222). Typically, the image (212) exhibits different characteristics in different local regions thereof. For example, different regions of the image (212) may show different distributions of texture frequency. Assuming that a TPB model has a limited capacity to model a region with certain accuracy, having a more uniform distribution of texture frequency along each dimension can utilize the TPB model's capacity more efficiently. In other words, an algorithmic way to redistribute the texture frequency can increase the model's accuracy within the same parameter budget. Based on this observation, the encoder (200) is configured to perform spatial domain coordinate reshaping (220) to map a regular (constant) interval of the sampled grid coordinate to non-uniform intervals such that the local image complexity (e.g., evaluated using the local standard deviation) can be more uniform to facilitate more-accurate subsequent TPB modeling. As already indicated above, the spatial reshaping function applied in the module (220) is constructed over the entire image (212) along each dimension individually. The spatial reshaping function applied in the module (220) is then modelled by its own TPB function in the modeling block (240) to generate a spatially reshaped signal model (242). Transmission to the decoder of the TPB model (242) in lieu of the underlying reshaped signal (222) enables the concomitant reduction of the corresponding bitrate overhead in the metadata bitstream (298).

A patch extraction module (230) operates to extract signals (232) of individual patches using the spatially reshaped signal (222). Then, the TPB optimization module (250) operates to compute optimized TPB models for the different patches of the image (212). More specifically, for each patch, the respective optimized TPB model is computed in the module (250) by finding parameter values for that model such that the difference between the respective image patch signal (232) and a reconstructed image patch signal (244) computed using the TPB model (242) is approximately minimized. In some examples, Rate-Distortion (R-D) optimization can be deployed to achieve an approximately highest quality of the reconstructed image at the decoder for a targeted bitrate.

A metadata generation module (260) operates to generate the metadata bitstream (298) based on (i) a parameter set (256) having the coefficients of the TPB model (242) and (ii) a plurality of parameter sets (258), with each parameter set (258) including coefficients of a respective patch-wise TPB function generated by the TPB optimization module (250). The parameter sets (258) are compressed in the metadata generation module (260) via non-linear quantization and arithmetic coding. The resulting compressed parameter sets are transmitted via the metadata bitstream (298) together with the side information for the non-linear quantization and arithmetic coding. The parameter set (256) is also transmitted via the metadata bitstream (298).

Figure 3:
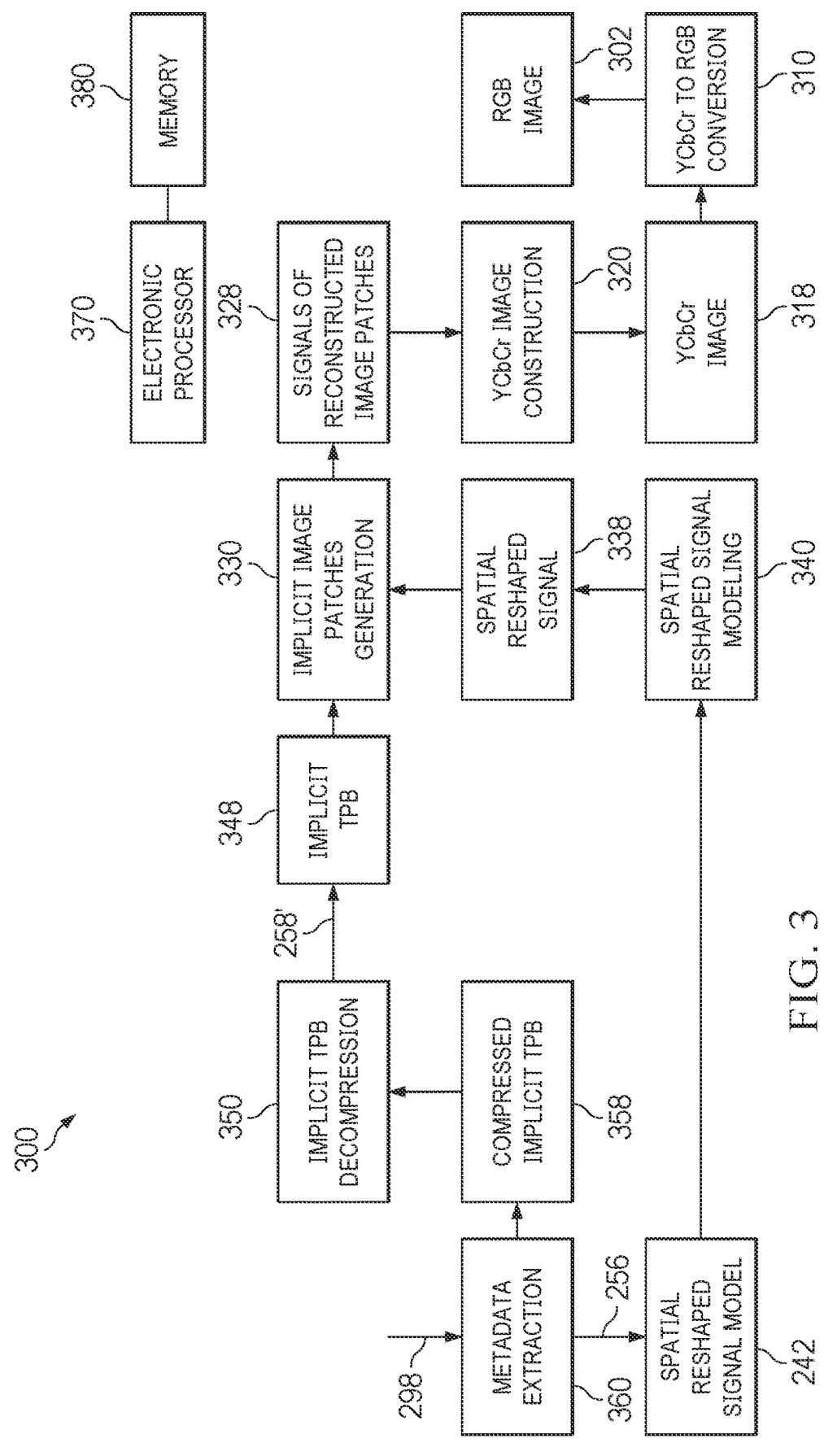
FIG. 3 is a block diagram illustrating a decoder that can be used in the delivery pipeline of FIG. 1 according to an embodiment.

FIG. 3 is a block diagram illustrating a decoder (300) according to an embodiment. Hardware of the decoder (300) includes an electronic processor (370) and a memory (380) operatively coupled to each other. The electronic processor (370) and the memory (380) enable various modules of the decoder (300) to perform various decoding operations described below. An example input to the decoder (300) includes the metadata bitstream (298) received from the encoder (200). The decoder (300) processes the metadata bitstream (298) to generate a reconstructed RGB image (302). In a typical example, the reconstructed RGB image (302) is a close approximation of the RGB image (202). In some examples, the decoder (300) is used in the decoding block (130) of the pipeline (100). In such examples, the image (302) is a part of the decoded signal (132).

A metadata extraction module (360) operates to parse the received metadata bitstream (298) into (i) the parameter set (256) having the coefficients of the TPB model (242) and (ii) a plurality of compressed parameter sets (358), with each compressed parameter set (358) being the compressed version of the respective parameter set (258) generated by the TPB optimization module (250) at the encoder (200). A modeling block (340) uses the TPB model (242) configured using the parameter set (256) to generate a spatially reshaped signal (338). A decompression module (350) operates to decompress the compressed parameter sets (358) to approximately reconstruct the parameter sets (258) via arithmetic decoding and inverse quantization configured using the applicable side information received via the metadata bitstream (298). In a typical example, the reconstruction of the parameter sets (258) in the decompression module (350) is not exact due to the lossy compression used at the encoder (200). As such, the output of the decompression module (350) is indicated as the parameter sets (258') to indicate the typically present differences from the parameter sets (258). The decoder (300) uses the parameter sets (258') to configure the corresponding patch-wise TPB models (348).

A patch generation module (330) uses the spatially reshaped signal (338) to feed the reshaped coordinates as inputs to the patch-wise TPB models (348) to generate signals (328) of reconstructed image patches. This procedure is repeated in the patch generation module (330) for each color channel of each patch. After the patch generation module (330) completes computations of the Y, Cb, and Cr color channels of all patches, a YCbCr image construction module (320) assembles the reconstructed patches into a reconstructed YCbCr image (318). In a typical example, the reconstructed YCbCr image (318) is a close approximation of the YCbCr image (212). Finally, a YCbCr-to-RGB converter (310) operates to convert the YCbCr image (318) into the RGB image (302).

Various examples of different operations performed in the encoder (200) and the decoder (300) are described in more detail in the four subsections that follow this subsection.

Frame-Based Spatial-Domain Coordinate Reshaping (Spatial Reshaping)

A typical image processed by the encoder (200) and decoder (300) exhibits significant diversity in different local regions thereof. Thus, "content complexity" may significantly vary in various regions of the image. This variability is addressed by the patch-based solution outlined above. The "model capacity" in each region is typically limited by the TPB model order. As such, besides adaptive selection of the TPB model order for each region, additional performance gains are realized by "adjusting" (reshaping) the content complexity in the spatial domain via nonlinear coordinate mapping. In other words, the content complexity can be reshaped such that each local region (e.g., each patch) can have more uniformity in terms of the content complexity.

In some examples, "content complexity" is defined based on the standard deviation from the average. Accordingly, a first image part is deemed to have a higher "content complexity" than a second image part when the standard deviation of the first image part is larger than the standard deviation of the second image part. We consider the standard deviation as a linear measure for the "content complexity." In some examples, a goal of spatial reshaping is to create a coordinate mapping function that can shift a non-uniform distribution of local content complexity toward being more uniform.

Let us denote the width and height for the input image (I) as W and H, respectively. The pixel (x, y) in the image can be represented as I(x, y). The spatial coordinate (x, y) is normalized to the range [0 1).

Let us denote the spatial domain coordinate reshaping functions along the x-axis (horizontal) and the y-axis (vertical) as $\gamma_h$ and $\gamma_v$, respectively. The mapped new spatial coordinate corresponding to (x, y) is denoted as $(\tilde{x}, \tilde{y})$ and expressed as:

$$\tilde{x} = \gamma_h(x) \tag{1}$$

$$\tilde{y} = \gamma_v(y) \tag{2}$$

Let us denote as $\sigma(x, y)$ the content complexity in a $W^L \times H^L$ local region (denoted as N(x, y)) centered at (x, y). A representative value of $(W^L, H^L)$ is (51,51). For the 2D standard deviation as a measure of content complexity, $\sigma(x, y)$ can be computed as follows:

$$\sigma(x, y) = std(I(x, y)) = \left( \frac{\sum_{(i,j) \in N(x,y)} (I(i, j) - \mu(x, y))^2}{W^L \times H^L} \right)^{0.5} \tag{3}$$

where $\mu(x, y)$ is the mean value in the local region N(x, y) expressed as:

$$\mu(x, y) = \frac{\sum_{(i,j)(x,y)} I(i, j)}{W^L \times H^L} \tag{4}$$

A desirable reshaping function is such that, after the reshaping, the local standard deviation becomes more uniform. In some examples, to simplify the reshaping function design and signaling in the bitstream (298), a 1D function for each dimension is used. Since the local standard deviation is measured in the corresponding 2D local area, the average standard deviation can be computed in each column and each row. Taking the x-axis as an example, one can first compute the average standard deviation for all pixels with the horizontal coordinate x as follows:

$$\sigma_h(x) = \frac{1}{H} \sum_{j=0}^{H-1} \sigma(x, j) \tag{5}$$

The sum, $\sigma_h$, of all columns $\sigma_h(x)$ can be computed as $$\sigma_h = \sum_{x=0}^{W-1} \sigma_h(x) \tag{6}$$

Similarly, the average standard deviation and the sum of all rows can be defined and computed for the (vertical) y-axis:

$$\sigma_v(y) = \frac{1}{W} \sum_{j=0}^{W-1} \sigma(j, y) \tag{7}$$

$$\sigma_v = \sum_{y=0}^{H-1} \sigma_v(y) \tag{8}$$

Again, taking the x-axis as an example, an objective for spatial reshaping is to find a mapping function, $\gamma_x( )$, to map the uniform grid {x} to a non-uniform grid {x'} such that the local standard deviation (STD) in the new grid {x'} is more uniform. In some examples, the objective is to find a function that has the following property:

$$\sigma_h(\gamma_h(x)) \approx \frac{1}{W} \tag{9}$$

In one example, this $\gamma_h( )$ mapping function is the normalized cumulative function of the local STD via the process of standard deviation equalization:

$$\hat{x} = \gamma_h(x) = \frac{\sum_{k=0}^{x} \sigma_h(k)}{\sigma_h} \tag{10}$$

A similar solution works for the y-axis and $\gamma_v( )$:

$$\hat{y} = \gamma_v(y) = \frac{\sum_{k=0}^{n} \sigma_v(k)}{\sigma_v} \tag{11}$$

Note that, with no reshaping applied, the corresponding mapping function is a bypass linear function, i.e., $\gamma_h(x)=x$ and $\gamma_v(y)=y$.

Figure 4A:
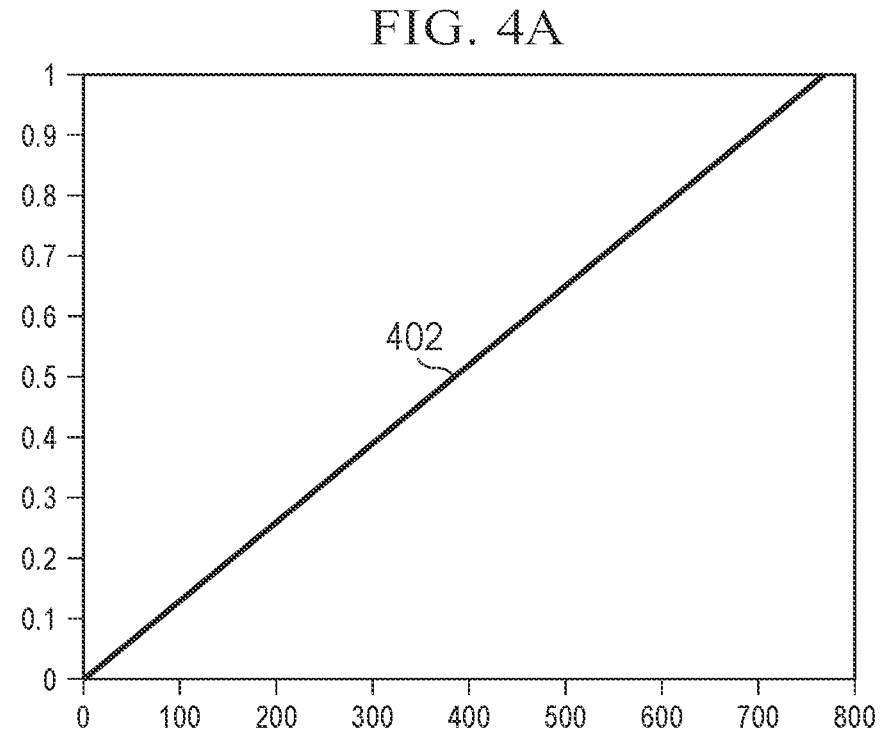
FIGS. 4A-4B graphically illustrate a spatial reshaping function computed in the encoder of FIG. 2 according to one example.
Figure 4B:
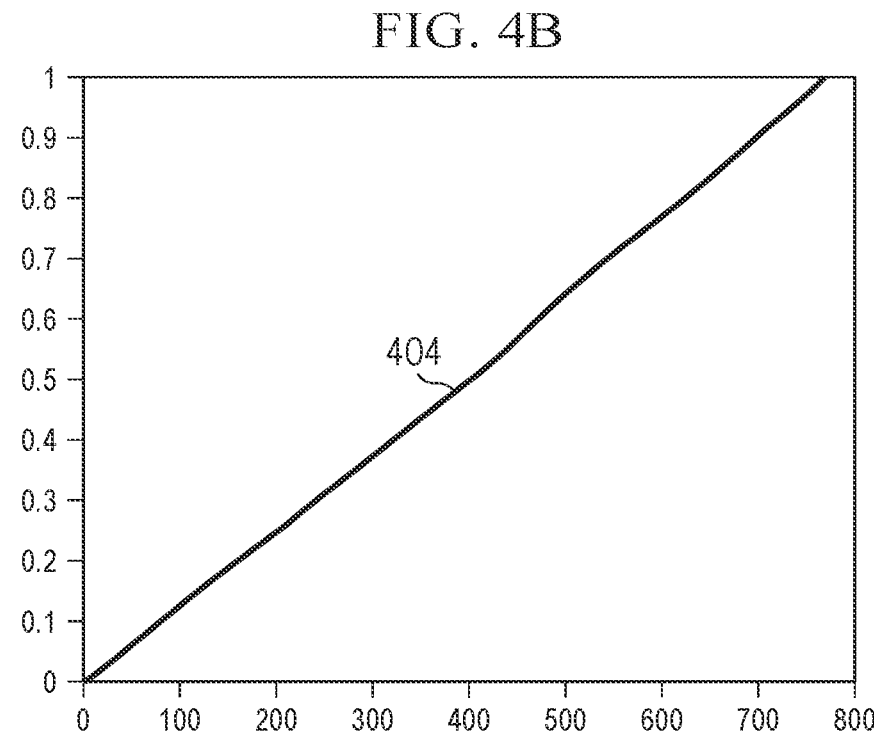

FIGS. 4A-4B graphically illustrate a 1D spatial reshaping function computed in the encoder (200) according to one example. The image (202) corresponding to this example is a color portrait of a woman wearing a red hat. FIG. 4A shows a graph of a linear coordinate-mapping function (402), i.e., illustrates a case with no spatial reshaping. FIG. 4B shows a graph of a spatial-domain coordinate-reshaping function (404) computed for the above-indicated example image (202) in the encoder (200) based on the local STD measurements as described above. At the same bit rate, the use of the reshaping function (404) results in a PSNR improvement of approximately 0.3 dB (as measured in the RGB color space for three color channels).

A spatial reshaping function, such as the example spatial reshaping function (404), is used in the spatial reshaping module (220) to convert regular (uniformly sampled) grid locations into non-uniformly spaced positions, e.g., as described above. This spatial reshaping function is then used in the downstream modules of the encoder (200) and is further used in the decoder (300) as indicated above. To reduce the overhead associated with the transmission of the spatial reshaping function from the encoder (200) to the decoder (300), the encoder (200) is configured to compress the spatial reshaping function using a corresponding TPB model generated in the modeling block (240) thereof. The description that follows details operations used to compress the spatial reshaping function based on a 1D TPB model.

Taking the x-axis modelling as an example, we have W input/output data pairs $$\left\{ \left( \frac{x}{W}, \gamma_h(x) \right), x = 0 \text{ to } W - 1 \right\}$$

from the spatial reshaping function. The corresponding TPB model serves as a regression model for approximating the spatial reshaping function. For convenience, the input range to TPB model is normalized to be in the interval [0 1). Thus, x/w is used instead of X. Note that, by definition, the value $\gamma_h(x)$ is already in the range [0 1).

With a set of selected knot points T (where T is the number of knots), and the B-spline order 1 (where 1 is the degree), with uniform intervals, and the corresponding $D^{sr,h}$ (=T+1−1) basis functions, $$B_t^{sr,h}(),$$

we can compute a prediction using coefficients $$\{m_t^{sr,h}\}$$

as:

$$\widehat{\gamma_h}(x) = f_{sr}^h(x) = \sum_{t=0}^{D^{sr,h}-1} m_t^{sr,h} B_t^{sr,h}(x) \tag{12}$$

After having compute all spatially reshaped signal values, those values area arranged in a matrix form and used to predict new values as follows:

$$\widehat{\gamma_h} = S^{sr,h} m^{sr,h} \tag{13}$$

where $$\widehat{\gamma_h} = \begin{bmatrix} \widehat{\gamma_h}(0) \\ \widehat{\gamma_h}(1) \\ \vdots \\ \widehat{\gamma_h}(W-1) \end{bmatrix} \tag{14}$$

$$m^{sr,h} = \begin{bmatrix} m_0^{sr,h} \\ m_1^{sr,h} \\ \vdots \\ m_{D^{sr,h}-1}^{sr,h} \end{bmatrix} \tag{15}$$

$$S^{sr,h} = \begin{bmatrix} B_0^{sr,h}(0) & B_1^{sr,h}(0) & \cdots & B_{D^{sr,h}-1}^{sr,h}(0) \\ B_0^{sr,h}\left(\frac{1}{W}\right) & B_1^{sr,h}\left(\frac{1}{W}\right) & \cdots & B_{D^{sr,h}-1}^{sr,h}\left(\frac{1}{W}\right) \\ \vdots & \vdots & & \vdots \\ B_0^{sr,h}\left(\frac{W-1}{W}\right) & B_1^{sr,h}\left(\frac{W-1}{W}\right) & \cdots & B_{D^{sr,h}-1}^{sr,h}\left(\frac{W-1}{W}\right) \end{bmatrix} \tag{16}$$

Let us denote the ground truth vector:

$$\gamma_h = \begin{bmatrix} \gamma_h(0) \\ \gamma_h(1) \\ \vdots \\ \gamma_h(W-1) \end{bmatrix} \tag{17}$$

An optimal solution for $$m_j^y$$

can be obtained via the least squares solution formulated as follows:

$$m^{sr,h,(opt)} = \left( \left( S^{sr,h} \right)^T S^{sr,h} \right)^{-1} \left( \left( S^{sr,h} \gamma_h \right) \right) \tag{18}$$

Note that solving this least-squares problem needs a suitably adjusted approach because the matrix $S^{sr,h}$ is typically sparse. For example, when the knot points are fixed regardless of the observed signal distribution, one might end up having empty pixels in some knot intervals in at least some examples. Because the basis function is only positive over a relatively small interval and is zero outside that interval, those empty knot intervals may cause one or more all-zero columns in $S^{sr,h}$. Those all-zero columns create irregularities for the matrix $(S^{sr,h})^T S^{sr,h}$ One possible solution to this problem is to remove the columns which have small value in $S^{sr,h}$ and set the corresponding coefficients to 0. A similar element removal process is also performed on the ground truth vector.

Let us denote each element in $S^{sr,h}$ as $S^{sr,h}(\alpha, \beta)$ and the $\alpha^{th}$ column as $S^{sr,h}(\alpha, :)$. The corresponding element in $\gamma_h$ is $\gamma_h(\alpha)$. Then, the following pseudocode can be used to implement computations of the above-outlined solution:

```
S̃^{sr,h} = 0_{0x0}
γ̃_h = 0_{0x0}
Φ^{sr,h} = { }
c = 0;
For each column, α, in S^{sr,h}
    // sum up the value of each element in the α^{th} column
    U_α = Σ_{β=0}^{W-1} S^{sr,h}(α, β)
    // retain the column if the sum is bigger than a threshold
    // add to new matrix
    If(U_α > δ)
        S̃^{sr,h} = [S̃^{sr,h} S^{sr,h}(α, :)]
        γ̃_h = [(γ̃_h)^T γ̃_h(α)]^T
        Φ^{sr,h} = Φ^{sr,h} ∪ α
        c ++
    end
end
```

In some examples, the set $\Phi^{sr,h}$ and the corresponding reduced-element matrix and vector are used to program the encoder (200) to solve the least squares problem:

$$\tilde{m}^{sr,h,(opt)} = \left( (\tilde{S}^{sr,h})^T \tilde{S}^{sr,h} \right)^{-1} \left( (\tilde{S}^{sr,h})^T \tilde{\gamma}_h \right) \tag{19}$$

Since several columns $(D^{sr,h}-c)$ are removed as indicated above, a corresponding optimal solution typically lacks several parameters. The encoder (200) operates to put back the optimal vector, and the removed $(D^{sr,h}-c)$ positions are filled with 0 values as indicated below:

$$m^{sr,h,(opt)}(\Phi^{sr,h}) = \tilde{m}^{sr,h,(opt)} \tag{20}$$

---

```
For α = 0 : 1 : D^{sr,h}-1
    If(α is in Φ^{sr,h})
        Find corresponding index α'in Φ^{sr,h} for a given α
        m^{sr,h,(opt)}(α) = m̃^{sr,h,(opt)}(α')
    else
        m^{sr,h,(opt)}(α) = 0
    end
end
```

---

Note that the encoder (200) uses the output from the spatial-reshaping TPB function as the input to the next stage of implicit TPB function modelling. For a given input x, the spatial-reshaping TPB function provides the approximated spatial reshaped coordinate $\hat{x}$. The same set of operations is applied to the input y to obtain the output $\hat{y}$. The number of knots is a TPB-model parameter that is in the range between 4 and 35 in various examples.

Optimization of Patch-Wise Implicit TPB Functions

Operations described in the previous section apply the spatial domain coordinate reshaping to the entire image to readjust the local image complexity. In contrast, this section describes patch-wise modeling, in which a separate implicit TPB (iTPB) model is obtained for each patch of the image. More specifically, for each color channel of each image patch, the encoder (200) operates to generate a respective individual TPB model characterized by a corresponding set of TPB coefficients. The encoder (200) also operates to perform optimization of those individual TPB models by adjusting the TPB coefficients to satisfy optimization criteria.

An implicit function takes the coordinate (rather than the pixel value) as an input. One example of an implicit function is the neural field, which is implemented using a neural network. In some examples, the neural field adopts a Multi-Layer Perceptron (MLP) to model (or explore) a continuous function, and the training thereof can take a relatively long time when relying on a multi-iteration solver (e.g., back propagation). Various embodiments disclosed herein use TPBs to implement implicit functions. The input to the TPB is the coordinate. With the ground truth data, a non-iterative least squares solution (deterministic way) is used to determine the TPB configuration. As a result, finding a suitable set of coefficients for the TPB model can be computationally lighter and faster than that of a functionally comparable neural field.

Let us consider a $k^{th}$ patch of the image and take the luma channel as an example. For this patch, we have a collection of the original input pixel coordinates within $\Phi_k = \{(x, y)\}$ and the corresponding spatially reshaped coordinates $\check{\Phi}_k = \{(\check{x}, \check{y})\}$ computed as described above. We normalize the reshaped coordinates in each dimension to be in the range [0 1]. In one example, the normalization is performed by finding the patch's min and max values $$(\check{x}_{min}^k, \check{x}_{max}^k)$$

for the x-axis and rescaling this range to [0 1] as:

$$\hat{x} = \frac{\breve{x} - \breve{x}_{min}^k}{\breve{x}_{max}^k - \breve{x}_{min}^k} \qquad (21)$$

The same operation is performed for the y-axis, with min and max value defining the range $$(\breve{y}_{min}^k, \breve{y}_{max}^k),$$

as follows:

$$\hat{y} = \frac{\breve{y} - \breve{y}_{min}^k}{\breve{y}_{max}^k - \breve{y}_{min}^k} \qquad (22)$$

The normalized coordinates form the set $\hat{\Phi} = \{(\hat{x}, \hat{y})\}$. The input to the implicit TPB function is $\hat{\Phi}_k$. The ground truth data is the pixel value in the corresponding original pixel location $\Phi_k$.

In some examples, the TPB basis function for predicting the luma channel is constructed by multiplying two sets of basis functions as follows:

$$B_{t^h,t^v}^{iTPB,Y}(\hat{x}, \hat{y}) = B_{t^h}^{Y,h}(\hat{y}) \cdot B_{t^v}^{Y,v}(\hat{y}) \qquad (23)$$

The prediction can be performed as:

$$\hat{S}_{iTPB}^{Y,k}(\hat{x}, \hat{y}) = f_{iTPB}^{Y,k}(\hat{x}, \hat{y}) = = \sum_{t^h=0}^{D_h^Y-1}\sum_{t^v=0}^{D_v^Y-1} m_{t^h,t^v}^{iTPB,Y,k} \cdot B_{t^h,t^v}^{iTPB,Y}(\hat{x}, \hat{y}) \qquad (24)$$

where $$\left\{m_{t^h,t^v}^{iTPB,Y,k}\right\}$$

are the TPB coefficients for the $k^{th}$ patch which are found through the optimization process.

In some examples, the 2D index (including $t^h$ and $t^v$) is vectorized to become a 1D index (denoted as $t^D$) for convenience and/or simplification of mathematical expressions. With the latter notation, for the basis function, we have:

$$B_{t^D}^{iTPB,Y}(\hat{x}, \hat{y}) = B_{t^h,t^v}^{iTPB,Y}(\hat{x}, \hat{y})\Big) \cdot B_{t^v}^{Y,v}(\hat{y}) \qquad (25)$$

With $$D^Y = D_h^Y \cdot D_v^Y,$$

the prediction can be expressed as:

$$\hat{S}^{iTPB,Yk}(\hat{x}, \hat{y}) = f_{iTPB}^{Y,k}(\hat{x}, \hat{y}) = \sum_{t^D=0}^{D^Y-1} m_{t^D}^{iTPB,Y,k} \cdot B_{t^D}^{iTPB,Y}(\hat{x}, \hat{y}) \qquad (26)$$

With the selected P pixels from the k-th patch, we can construct the matrix form for the design matrix with the spatial reshaped coordinates $(\hat{x}_i, \hat{y}_i)$ as follows:

$$(27)$$

$$S^{iTPB,Y,k} =$$

$$\begin{bmatrix} B_0^{iTPB,Y}(\hat{x}_0, \hat{y}_0) & B_1^{iTPB,Y}(\hat{x}_0, \hat{y}_0) & \cdots & B_{D^Y-1}^{iTPB,Y}(\hat{x}_0, \hat{y}_0) \\ B_0^{iTPB,Y}(\hat{x}_1, \hat{y}_1) & B_1^{iTPB,Y}(\hat{x}_1, \hat{y}_1) & \cdots & B_{D^Y-1}^{iTPB,Y}(\hat{x}_1, \hat{y}_1) \\ \vdots & \vdots & \ddots & \vdots \\ B_0^{iTPB,Y}(\hat{x}_{P-1}, \hat{y}_{P-1}) & B_1^{iTPB,Y}(\hat{x}_{P-1}, \hat{y}_{P-1}) & \cdots & B_{D^Y-1}^{iTPB,Y}(\hat{x}_{P-1}, \hat{y}_{P-1}) \end{bmatrix}$$

The coefficients are expressed as a vector, e.g., as follows:

$$m^{iTPB,Y,k} = \begin{bmatrix} m_0^{iTPB,Y,k} \\ m_1^{iTPB,Y,k} \\ \vdots \\ m_{D^Y-1}^{iTPB,Y,k} \end{bmatrix} \qquad (28)$$

The corresponding prediction is expressed as:

$$\hat{I}^{iTPB,Y,k} = S^{iTPB,Y,k} m^{iTPB,Y,k} \qquad (29)$$

Next, we describe how the iTPB coefficients are optimized in the optimization module (250) according to an embodiment.

Let us denote the ground truth vector using the original coordinate $\{(x, y)\}$ for the reference base-layer luma as follows:

$$I^{Y,k} = \begin{bmatrix} I^Y(x_0, y_0) \\ I^Y(x_1, y_1) \\ \vdots \\ I^Y(x_{P-1}, y_{P-1}) \end{bmatrix} \qquad (30)$$

Note that the ground truth data are collected for the original coordinate $(x, y)$. An optimal solution of $m^{iTBP,Y,k}$ is obtained via the least squares solution:

$$m^{iTPB,Y,k,(opt)} = \left(\left(S^{iTPB,Y,k}\right)^T S^{iTPB,Y,k}\right)^{-1}\left(\left(S^{iTPB,Y,k}\right)^T I^{Y,k}\right) \qquad (31)$$

For the sake of brevity and clarity, we define the following matrix and vector:

$$B^{iTPB,Y,k} = \left(\left(S^{iTPB,Y,k}\right)^T S^{iTPB,Y,k}\right) \qquad (32)$$

$$a^{iTPB,Y,k} = \left(S^{iTPB,Y,k}\right)^T I^{Y,k}\Big) \qquad (33)$$

Then, Eq. (31) can be rewritten as:

$$m^{iTPB,Y,k,(opt)} = \left(B^{iTPB,Y,k}\right)^{-1} a^{iTPB,Y,k} \qquad (34)$$

For a chroma channel, one can follow the same procedure to build $B^{iTPB,C,k}$ and $\alpha^{iTPB,C,k}$ where C stands for the Cb channel or the Cr channel, and compute the least squares solution as:

$$m^{iTPB,C,k,(opt)} = \left(B^{iTPB,C,k}\right)^{-1} d^{iTPB,C,k} \qquad (35)$$

In various examples, Eqs. (34) and (35) are used to program the optimization module (250).

Compression of Implicit TPB Coefficients

Figure 5:
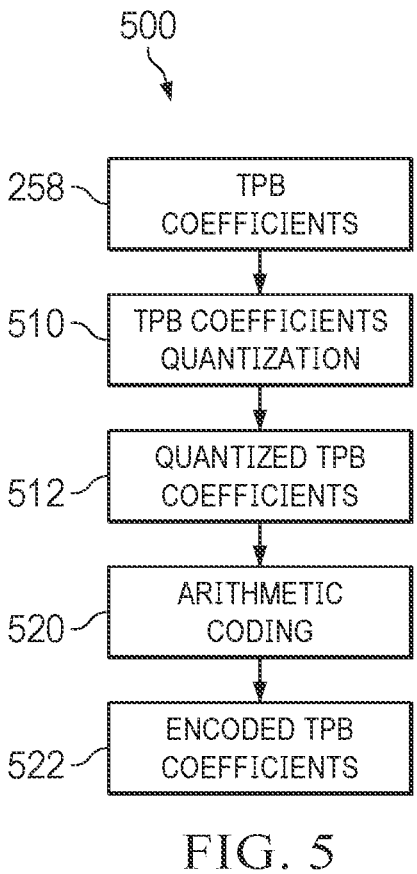
FIG. 5 is a block diagram illustrating compression operations performed in the encoder of FIG. 2 according to an embodiment.

FIG. 5 is a block diagram illustrating TPB-coefficients compression operations (500) performed in the metadata generation module (260) according to an embodiment. The input to the compression operations (500) includes the parameter sets (258) having the optimized iTPB coefficients computed, e.g., as described above. In the example shown, the compression operations include blocks of operations (510, 520). The first block (510) operates to apply non-linear quantization to the iTPB coefficients. The second block (520) operates to apply arithmetic coding to compress the resulting quantized TPB coefficients (512), thereby generating a corresponding stream (522) of compressed iTPB coefficients. Note that the compression operations of the first block (510) are lossy, and the configuration of those operations typically controls the amount of information loss. The compression operations of the second block (520) are lossless, and the configuration of those operations typically controls the bit rate. To achieve an optimal Rate-Distortion (R-D) combination, the configurations of both blocks (510, 520) can be tuned, e.g., as described in the R-D optimization subsection below. The data stream (522) generated by the compression operations (500) is transmitted to the decoder (300) with the metadata bitstream (298).

Let us denote the implicit TPB function coefficients at the $k^{th}$ patch for the color channel c as $$\left\{m_t^{iTPB,c,k}\right\},$$

where t is the index to the coefficient. The data type for those TPB coefficients from the TPB solver of the optimization module (250) is the "floating point." In one example, the length is 64 bits (using double precision). The quantization operations of the block (510) reduce the number of bits using the floating point or integer type.

Figure 6:
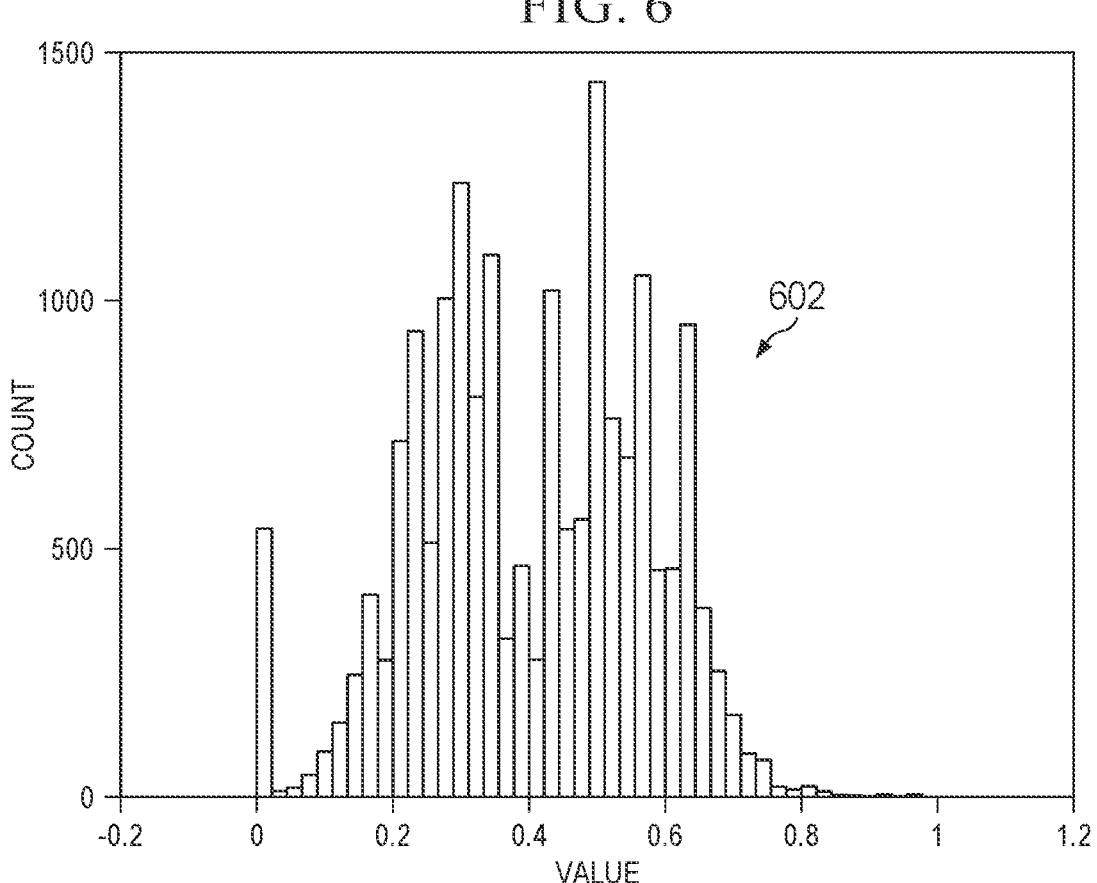
FIG. 6 shows a bar plot graphically illustrating the distribution of uniformly quantized TPB coefficient values according to one example.

FIG. 6 shows a bar plot (602) illustrating the distribution of uniformly quantized 6-bit TPB coefficients values according to one example. This specific example corresponds to the entire $1^{st}$ Kodak dataset image. As evident from the bar plot (602), the distribution is non-uniform and is skewed towards the positive values. More specifically, most of the coefficients are positive and are clustered at low magnitudes. Another observation from the bar plot (602) is that the distribution is substantially contained within the [0 1] range, with only a small fraction of the values being outside the [0 1] range. Based on these two observations, the block (510) is configured to apply non-linear quantization (NLQ) operations to give a higher preference to the values located within the [0 1] relative to other values. Note that the maximum magnitude for the TPB coefficients is unbounded because the coefficient values are directly output from the least squares algorithm. As such, the NLQ used in the block (510) is configured to address the resulting relatively large dynamic range of the TPB coefficients. In one example, the NLQ used in the operations block (510) is implemented using logarithmic domain quantization.

In some examples, the block (510) first operates to find the maximum magnitude of the implicit TPB coefficients in $$\left\{m_t^{iTPB,c,k}\right\}$$

as:

$$m_{absmax}^{iTPB,c,k} = \max\left\{\mathrm{abs}\left(m_t^{iTPB,c,k}\right) \,\middle|\, \forall\, t\right\} \qquad (36)$$

Next, the block (510) operates to determine the corresponding log base, $lb^{c,k}$, as follows:

$$lb^{c,k} = \left(m_{absmax}^{iTPB,c,k}\right)^{\frac{1}{2^Q}} \qquad (37)$$

where $2^Q$ is the number of non-uniform intervals in the range from 0 to $$m_{absmax}^{iTPB,c,k},$$

which follows the logarithmic trend. Then, the absolute values of the iTPB coefficients (magnitude) are quantized as follows:

$$q_t^{c,k} = \mathrm{round}\left(\log_{lb^{c,k}}\left(\left|m_t^{iTPB,ck}\right| + 1\right)\right) \qquad (38)$$

The sign of the coefficient is also extracted and represented as 1 or 0, with 1 representing non-negative values, and 0 representing negative values. The following formula provides an example expression for the sign extraction operation:

$$s_t^{c,k} = \left(m_t^{iTPB,c,k} \geq 0\right)?\,1{:}0 \qquad (39)$$

where the operator x?y: z means (if x is true then evaluates to the value of y; otherwise, evaluates to the value of z). Upon performing operations corresponding to Eqs. (36)-(39), the block (510) has produced the sets $$\left\{q_t^{c,k}\right\} \text{ and } \left\{s_t^{c,k}\right\}.$$

In some examples, the magnitude sets $$\left\{q_t^{c,k}\right\}$$

are further compressed in the block (520) using arithmetic coding, e.g., as described below. In contrast, the sign sets $$q_t^{c,k}$$

are passed to the data stream (522) without further compression.

The decoder (300) operates to de-quantize the quantized coefficient $$\{s_t^{c,k}\}$$

and assign to the dequantized coefficient the corresponding sign $$s_t^{c,k}.$$

In some examples, the decoder (300) is configured to reconstruct the iTPB coefficients $$\{\hat{m}_t^{iTPB,c,k}\}$$

as follows:

$$|\widehat{dq}_t^{c,k}| = \exp\!\left(\log\!\left(lb^{c,k}\right) \cdot q_t^{c,k}\right) - 1 \tag{40}$$

$$\hat{m}_t^{iTPB,c,k} = \left(s_t^{c,k} == 1\right)? \ |\widehat{dq}_t^{c,k}| : -|\widehat{dq}_t^{c,k}| \tag{41}$$

The signal predicted using the de-quantized TPB coefficients is represented as follows:

$$\hat{I}^{iTPB,Y,k} = S^{iTPB,Y,k}\hat{m}^{iTPB,Y,k} \tag{42}$$

where $$\hat{I}^{iTPB,Y,k} = \begin{bmatrix} \hat{I}^{Y,k}(x_0, y_0) \\ \hat{I}^{Y,k}(x_1, y_1) \\ \vdots \\ \hat{I}^{Y,k}(x_{P-1}, y_{P-1}) \end{bmatrix} \tag{43}$$

For the $k^{th}$ patch having the patch size ($W^p$, $H^p$), using the number of TPB basis functions $$\left(D_h^{Y,k},\ D_v^{Y,k}\right)$$

and the number of bits in the TPB coefficient $Q^k$, one can evaluate the distortion as:

$$D^{Y,k}\!\left(W^p,\ H^p, D_h^{Y,k},\ D_v^{Y,k},\ Q^k\right) = \sum_{i=0}^{|\Phi_k|-1} \left\| \hat{I}^{Y,k}(x_i, y_i) - I^{Y,k}(x_i, y_i) \right\|^2 \tag{44}$$

Based on Eq. (44), the total distortion over all patches can be computed as:

$$D^Y\!\left(W^p,\ H^p,\ \{D_h^{Y,k},\ D_v^{Y,k},\ Q^k\}\right) = \sum_k D^{Y,k}\!\left(W^p,\ H^p,\ D_h^{Y,k},\ D_v^{Y,k},\ Q^k\right) \tag{45}$$

From experimentation and simulation, the inventors found that quantization to Q=6 bits provides an acceptable R-D tradeoff for many types of images (202).

After quantizing the TPB coefficients in the block (510), the compression operations proceed to the arithmetic coding of the block (520), which further compresses the TPB coefficients $$\{q_t^{c,k}\}$$

(which are treated as symbols). Arithmetic coding (AC) is a form of entropy encoding used for lossless data compression, and the underlying idea of AC is to explore the probability of occurrence for each symbol. Under AC, a more-frequently occurring symbol takes a smaller portion of bits compared to that of a less-frequently occurring symbol, thereby enabling a statistical gain. Unlike Huffman coding, which builds a tree and assigns a fixed codeword to each symbol, AC partitions a number line in [0 1] according to the probability of each symbol recursively and can realize a fractional number of bits for better compression. In various embodiments, the block (520) is configured to use arithmetic coding to compress the quantized TPB coefficients (512).

Let us denote the number of bits after applying the arithmetic coding to the quantized TPB coefficient in each patch as $$R^{Y,k}\!\left(W^p, H^p, D_h^{Y,k}, D_v^{Y,k}, Q^k\right) \tag{46}$$

The total number of bits in all patches plus other overhead, $R^{Y,o}$ can be expressed as:

$$R^{Y,k}\!\left(W^p, H^p, \{D_h^{Y,k}, D_v^{Y,k}, Q^k\}\right) = R^{Y,o} + \sum_k R^{Y,k}\!\left(W^p, H^p, D_h^{Y,k}, D_v^{Y,k}, Q^k\right) \tag{47}$$

In various examples, the AC overhead is the side information needed for the decoder (300) to decode the data stream (522) generated by the compression operations (500). The syntax of the data stream (522) is compatible with the format of the corresponding metadata stream (298).

Figure 7A:
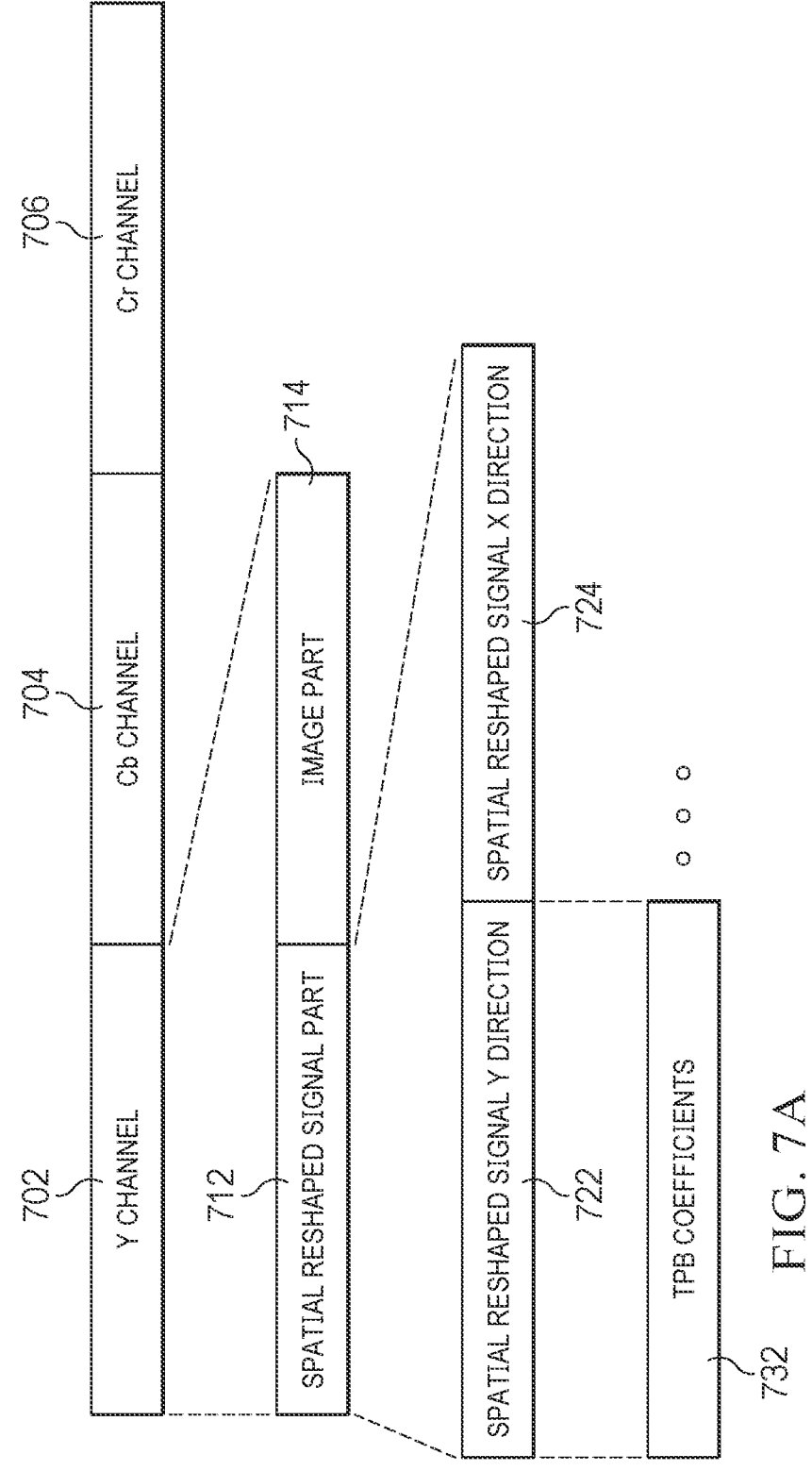
FIGS. 7A-7B are block diagrams illustrating an example format of a metadata stream transmitted from the encoder of FIG. 2 to the decoder of FIG. 3 according to an embodiment.
Figure 7B:
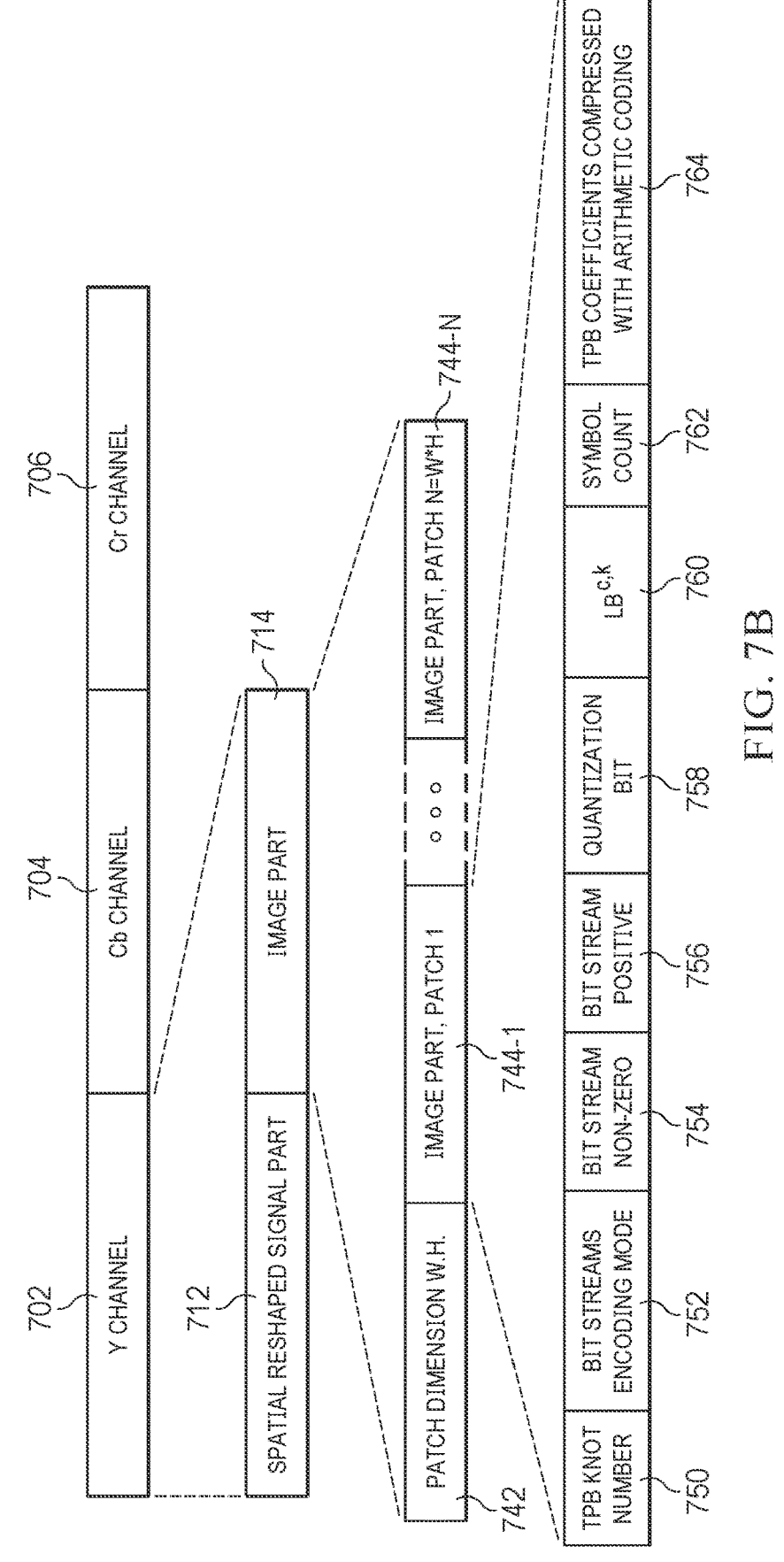
Figure 8A:
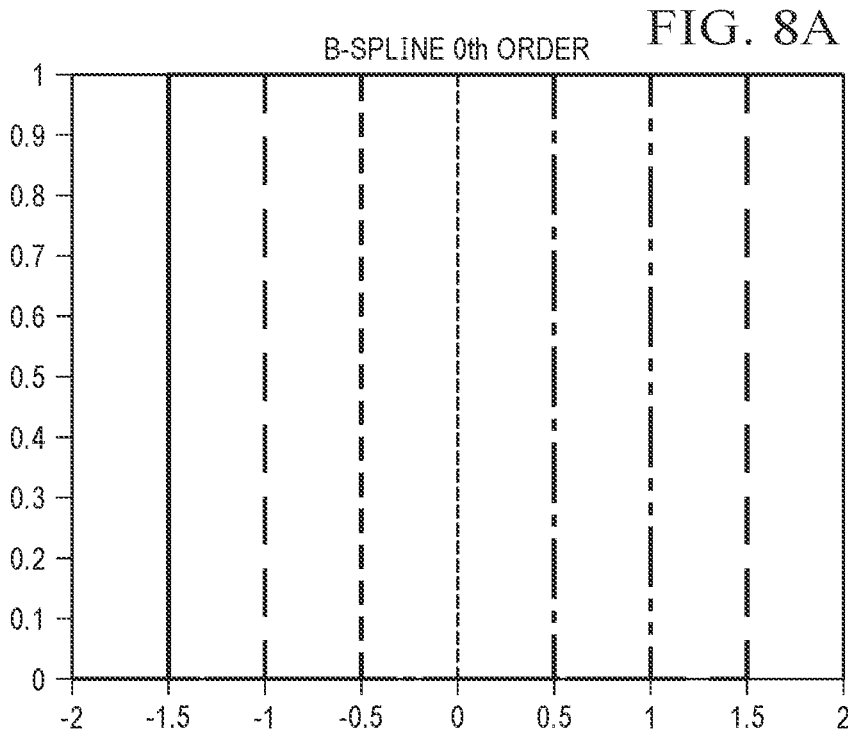
FIGS. 8A-8D are graphs illustrating sets of $0^{th}$ to $3^{rd}$ order B-Spline basis functions for a uniform distribution of knot points according to one example.
Figure 8B:
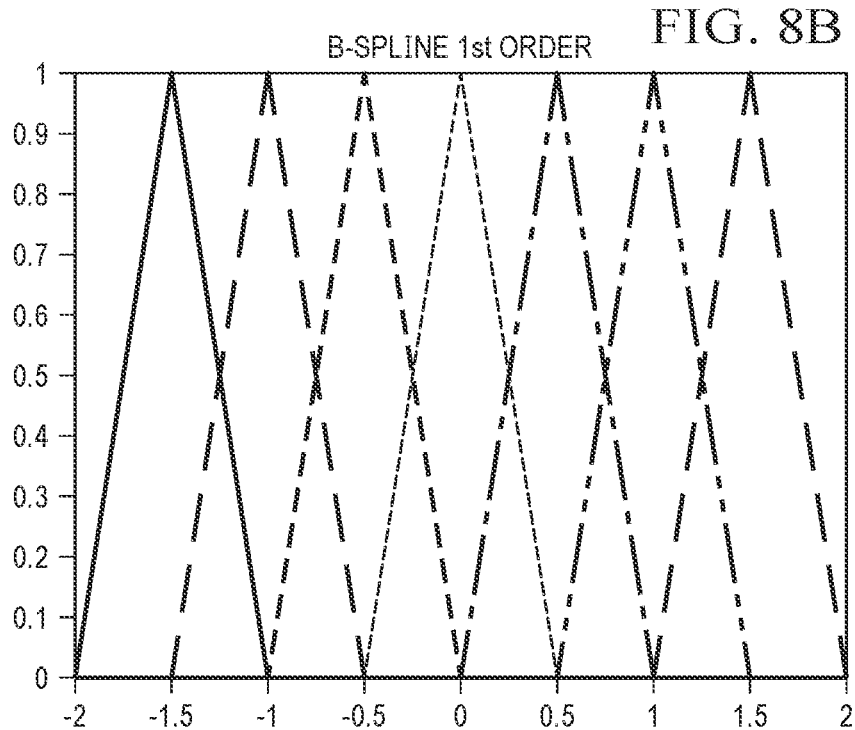
Figure 8C:
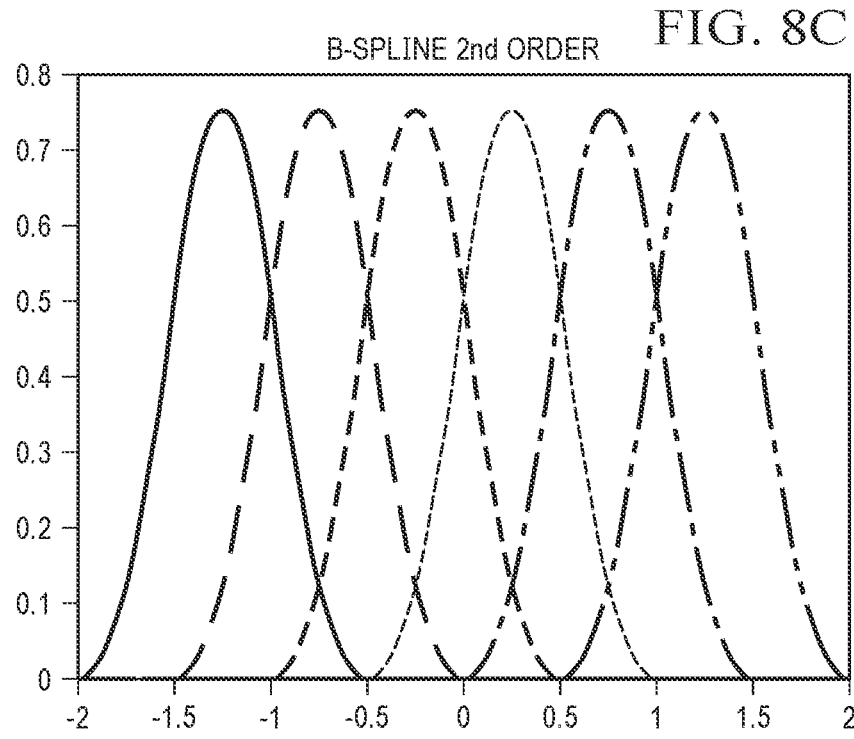
Figure 8D:
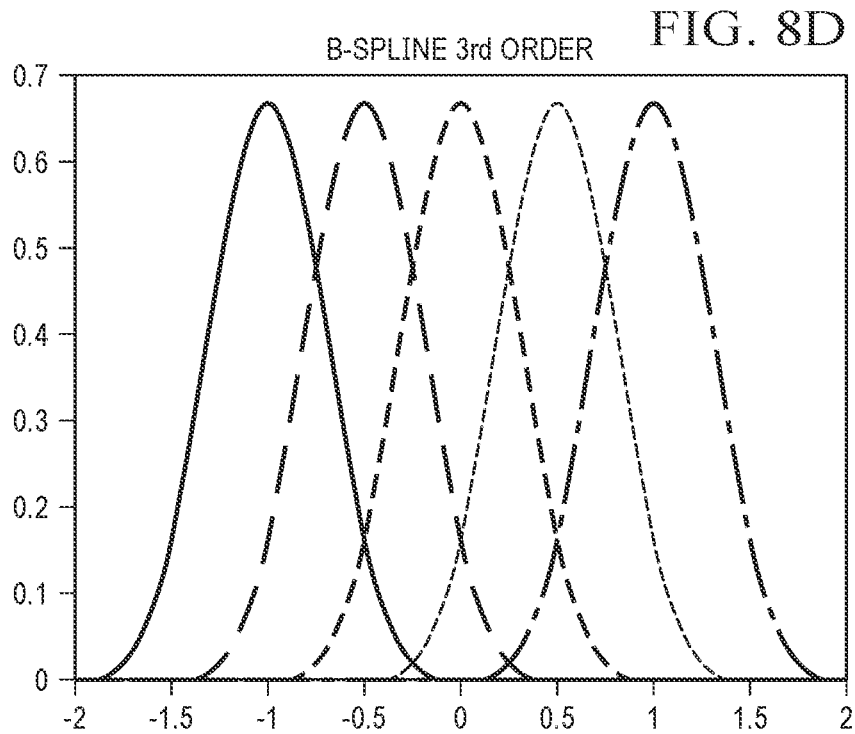

FIGS. 7A-7B are block diagrams illustrating an example format of the metadata stream (298) according to an embodiment. In the example shown, the metadata stream (298) is configured to transmit a compressed color image (202). Accordingly, the metadata stream (298) includes three corresponding portions (702, 704, 706). The first portion (702) contains data representing the Y channel. The second portion (704) contains data representing the Cb channel. The third portion (706) contains data representing the Cr channel. For illustration purposes and without any implied limitations, only the format of the first portion (702) representing the Y channel is explicitly shown in FIGS. 7A-7B. In some examples, each of the second portion (704) and the third portion (706) representing the Cb and Cr channels, respectively, has the same format as that of the first portion (702). The first portion (702) is partitioned to include first and second parts (712, 714). The first part (712) includes data representing the TPB model (242), i.e., the TPB model of the spatial reshaping function. The second part (714) includes data representing the parameter sets (258) of the patch-wise TPB models. FIG. 7A illustrates details of the first part (712). FIG. 7B similarly illustrates details of the second part (714).

Referring to FIG. 7A, the first part (712) of the luma portion (702) includes metadata (722) representing the spatially reshaped signal (222) for the y direction and further includes metadata (724) representing the spatially reshaped signal (222) for the x direction. In some examples, the TPB model's order and number of knots are fixed. In such examples, transmission of the spatial-reshaping-function TPB model can be accomplished by transmitting a fixed number (e.g., six) of TPB coefficients per direction. The metadata (722) for the y direction thus includes a first set (732) of such TPB coefficients, which is explicitly shown in FIG. 7A. The metadata (724) for the x direction includes a similar second set of such TPB coefficients (not explicitly shown in FIG. 7A). In some examples, the metadata (722, 724) collectively include twelve floating-point coefficient values.

Referring to FIG. 7B, the second part (714) of the luma portion (702) includes a patch dimension field (742) and a plurality of patch-level metadata fields (744-1, . . . , 744-N). The patch dimension field (742) contains the patch width and height values W, H. Each of the patch-level metadata fields (744-$n$), where n=1, . . . , N, includes a respective set of subfields (750-764). For illustration purposes, only the set of subfields (750-764) corresponding to the patch-level metadata field (744-1) is explicitly shown in FIG. 7B. Each of the other patch-level metadata fields (744-$n$) has a similar set of subfields (750-764) (not explicitly shown in FIG. 7B).

The first subfield (750) specifies the TPB knot number for the patch. The second subfield (752) specifies the bitstreams encoding mode. The third subfield (754) specifies whether a coefficient is non-zero (NZ) or zero (Z). For Mode 0 non-compressed format, the third subfield (754) uses one bit to represent the type of zero/non-zero value for each coefficient. For Mode 1 compressed format, the third subfield (754) uses run-length coding (NZ/Z, run). For each run-length symbol, 1 bit for NZ/Z and 8 bits to represent the RUN are used. The encoder (200) chooses the smaller size of the two modes. The fourth subfield (756) uses the 1-bit syntax to specify whether a coefficient is positive or negative. For Mode 0 non-compressed format, the fourth subfield (756) uses one bit to represent the sign positive (P) or negative (N) for each coefficient. If the coefficient is 0, then no signal is needed, from the NZ/Z flag of the third subfield (754). For Mode 1 compressed format, the fourth subfield (756) uses run-length coding (P/N, run). For each run-length symbol, 1 bit for P/N and 8 bits to represent the RUN are used. The encoder chooses the smaller size of two modes. The fifth subfield (758) signals the number of quantization bits. The sixth subfield (760) contains the $$lb^{c,k} = \left(m_{absmax}^{iTPB,c,k}\right)^{\frac{1}{2^Q}}$$

value. The seventh subfield (762) contains the AC symbol probability. The eighth subfield (764) contains the AC-coded quantized TPB coefficient.

Rate-Distortion (R-D) Optimization

In some examples, several algorithm parameters are adjusted to optimize the PSNR or bit rate. These parameters include:

Patch size (W$^p$, H$^p$).

Number of basis functions $$\left(D_h^{Y,k}, D_v^{Y,k}\right).$$

Number of bits in the TPB coefficient Q.

Once those five parameters are determined, the PSNR can be measured from the reconstructed image, and the bit rate can be computed with additional arithmetic coding as described below in reference to the luma channel as an example.

With a target bit rate, R$^T$, this R-D optimization problem can be formulated as an optimization problem to minimize the distortion (e.g., to maximize the PSNR), e.g., as follows:

$$\left\{W^{p,(opt)}, H^{p,(opt)}, \left\{D_h^{Y,k,(opt)}, D_v^{Y,k,(opt)}, Q^{k,(opt)}\right\}\right\} = \qquad (48)$$
$$\min_{\{W^p, H^p, D_h^Y, D_v^Y, Q\}} D^Y\left(W^p, H^p, \left\{D_h^{Y,k}, D_v^{Y,k}, Q^k\right\}\right)$$

subject to $$R^Y\left(W^p, H^p, D_h^Y, D_v^Y, Q\right) \le R^T \qquad (49)$$

To simplify the problem, one can enforce W$^p$=H$^p$, and $$D_h^Y = D_v^Y,$$

and select all Q$^k$=Q in some examples. As a result, the optimization problem is reduced to three parameters and is reformulated as:

$$\left\{W^{p,(opt)}, D_h^{Y,(opt)}, Q^{(opt)}\right\} = \min_{\{W^p, D_h^Y, Q\}} D^Y\left(W^p, D_h^Y, Q\right) \qquad (50)$$

subject to $$R^Y\left(W^p, D_h^Y, Q\right) \le R^T \qquad (51)$$

In some examples, to obtain an optimal solution, a full search algorithm is deployed to search all possible combinations of $$\left\{W^p, D_h^Y, Q\right\},$$

e.g., based on the following pseudocode:

```
// initialization
D^{Y,(opt)} = inf
// full search
```

-continued

```
For all possible {W^P, {D_h^{Y,k}}, Q}

Compute R^Y(W^P, {D_h^{Y,k}}, Q)

if(R^Y(W^P, {D_h^{Y,k}}, Q) ≤ R^T)

Compute D^Y(W^P, {D_h^{Y,k}}, Q)

If(D^{Y,(opt)} > D^Y(W^P, {D_h^{Y,k}}, Q))

{W^{P,(opt)}, {D_h^{Y,k,(opt)}}, Q^{(opt)}} = {W^P, {D_h^{Y,k}}, Q}

D^{Y,(opt)} = D^Y(W^P, {D_h^{Y,k}}, Q)

end
  end
end
```

Note that the above full search may take a relatively long time and be impractical for some applications. From experimentation and simulation, the inventors found that, in some examples, the fixed values Q=6 and $W^P$=256, $H^P$=256 can be used, leaving only the $$D_h^Y$$

to be searched for the optimal solution. The latter approach can be implemented based on the following pseudocode:

```
// initialization
D^{Y,(opt)} = inf
Q = 6
W^P = 256,
H^P = 256
// full search For all possible {D_h^{Y,k}}

Compute R^Y(W^P, {D_h^{Y,k}}, Q)

if(R^Y(W^P, {D_h^{Y,k}}, Q) ≤ R^T)

Compute D^Y(W^P, {D_h^{Y,k}}, Q)

If(D^{Y,(opt)} > D^Y(W^P, {D_h^{Y,k}}, Q))

{D_h^{Y,k,(opt)}} = {D_h^{Y,k}}

D^{Y,(opt)} = D^Y(W^P, {D_h^{Y,k}}, Q)

end
  end
end
```

In some examples, the R-D optimization can be further sped up using a greedy algorithm. For all patches, the algorithm starts to provide the same number of knots. Then, in each iteration, the algorithm assigns a delta number of knots, $$\Delta D_h^Y,$$

in each patch, selects the patch having the best PSNR, and assigns that patch with more knots. This procedure is repeated until the algorithm hits the bit rate constraint. This greedy algorithm can be implemented, e.g., based on the following pseudocode:

```
// initialization
D^{Y,(opt)} = inf
Q = 6
W^P = 256,
H^P = 256

D_h^{Y,k} = ΔD_h^Y

Compute required bits R using {D_h^{Y,k}}

// greedy search
While(R < R^T)
  For each patch

Increase knots D_h^{Y,k,temp} = D_h^{Y,k} + ΔD_h^Y

Compute D^{Y,k}(W^P, D_h^{Y,k,temp}, Q)

Find the patch having the best performance k* = arg min_k {D^{Y,k}(W^P, D_h^{Y,k,temp}, Q)} end
  Assign the increased knots to patch k*

D_h^{Y,k*} = D_h^{Y,k*} + ΔD_h^Y

Compute the bits for patch k*

R^{Y,k*}(W^P, H^P, D_h^{Y,k*}, D_v^{Y,k*}, Q^k)

R = R + R^{Y,k*}(W^P, H^P, D_h^{Y,k*}, D_v^{Y,k*}, Q^k)

end
```

According to an example embodiment disclosed above, e.g., in the summary section and/or in reference to any one or any combination of some or all of FIGS. 1-8, provided is An image-compression method, comprising: generating, with an electronic encoder, a first tensor product B-spline (TPB) model representing an image, the first TPB model approximating a spatial reshaping function configured to map uniformly sampled locations within the image to non-uniformly spaced positions; generating, with the electronic encoder, a plurality of second TPB models, each of the second TPB models representing a respective patch of the image and configured to estimate an image signal within the respective patch as a function of reshaped coordinate, the reshaped coordinate being determined using the spatial reshaping function; and generating, with the electronic encoder, a metadata stream including first metadata representing a set of coefficients of the first TPB model and second metadata representing sets of coefficients of the plurality of second TPB models.

In some embodiments of the above method, generating the second metadata comprises compressing, with the electronic encoder, the sets of coefficients of the plurality of second TPB models.

In some embodiments of any of the above methods, said compressing comprises: generating quantized sets of coefficients by quantizing each coefficient to a smaller number of bits; and applying arithmetic coding to the quantized sets of coefficients.

In some embodiments of any of the above methods, the metadata stream includes side information characterizing at least one of the quantizing and the arithmetic coding.

In some embodiments of any of the above methods, the method further comprises partitioning the image, with the electronic encoder, into a plurality of nonoverlapping patches, wherein each respective patch is selected from the plurality of nonoverlapping patches.

In some embodiments of any of the above methods, the image is a YCbCr image; and wherein the method further comprises generating the YCbCr image by applying RGB-to-YCbCr conversion to an RGB image.

In some embodiments of any of the above methods, the plurality of second TPB models includes a plurality of luma-channel TPB models and a plurality of chroma-channel TPB models.

In some embodiments of any of the above methods, the spatial reshaping function is configured to shift a nonuniform distribution of local content complexity in the image toward being more uniform.

In some embodiments of any of the above methods, a two-dimensional standard deviation is a measure of the local content complexity.

In some embodiments of any of the above methods, said generating the plurality of second TPB models comprises: for a second TPB model from the plurality of second TPB models, finding a respective set of coefficients that causes a difference between the image signal and an estimate of the image signal in the respective patch to be approximately minimized, the estimate of the image signal being computed using the second TPB model.

In some embodiments of any of the above methods, said finding is based on least squares minimization.

In some embodiments of any of the above methods, the method further comprises transmitting the metadata stream, via a communication channel, to an electronic decoder.

In some embodiments of any of the above methods, the reshaped coordinate is normalized to be in a range [0 1].

In some embodiments of any of the above methods, the compressing comprises applying entropy coding to the quantized sets of coefficients.

In some embodiments of any of the above methods, the entropy coding includes one of arithmetic coding and Huffman coding.

In some embodiments of any of the above methods, the quantizing comprises applying nonlinear quantization to the coefficients of the plurality of second TPB models.

In some embodiments of any of the above methods, the image-compression method further comprises performing rate-distortion optimization to select one or more parameters from the group consisting of a patch size, a number of basis functions, and a number of bits for a quantized TPB coefficient.

In some embodiments of any of the above methods, the rate-distortion optimization is based on a greedy algorithm.

In some embodiments of any of the above methods, the spatial reshaping function is a normalized cumulative function of local standard deviation computed via a process of standard deviation equalization (e.g., as expressed by Eqs. (10)-(11)).

According to another example embodiment disclosed above, e.g., in the summary section and/or in reference to any one or any combination of some or all of FIGS. 1-8, provided is an apparatus for image compression, the apparatus comprising: at least one processor; and at least one memory including program code, wherein the at least one memory and the program code are configured to, with the at least one processor, cause the apparatus at least to: generate a first tensor product B-spline (TPB) model representing an image, the first TPB model approximating a spatial reshaping function configured to map uniformly sampled locations within the image to non-uniformly spaced positions; generate a plurality of second TPB models, each of the second TPB models representing a respective patch of the image and configured to estimate an image signal within the respective patch as a function of reshaped coordinate, the reshaped coordinate being determined using the spatial reshaping function; and generate a metadata stream including first metadata representing a set of coefficients of the first TPB model and second metadata representing sets of coefficients of the plurality of second TPB models.

According to yet another example embodiment disclosed above, e.g., in the summary section and/or in reference to any one or any combination of some or all of FIGS. 1-8, provided is an image-decompression method, comprising: receiving, with an electronic decoder, a metadata stream including first metadata representing a set of coefficients of a first tensor product B-spline (TPB) model and second metadata representing sets of coefficients of a plurality of second TPB models, the first TPB model approximating a spatial reshaping function configured to map uniformly sampled locations within a source image to non-uniformly spaced positions, each of the second TPB models representing a respective patch of the source image and configured to estimate an image signal within the respective patch as a function of reshaped coordinate, the reshaped coordinate being determined based on the spatial reshaping function; generating, with the electronic decoder, a plurality of reconstructed image patches based on the first TPB model and further based on the plurality of second TPB models, the first TPB model being reconstructed using the first metadata, the plurality of second TPB models being reconstructed using the second metadata; and constructing, with the electronic decoder, an estimated image by assembling the plurality of reconstructed image patches in an image frame.

In some embodiments of the above method, the method further comprises decompressing the second metadata, with the electronic decoder, to reconstruct the sets of coefficients of the plurality of second TPB models.

In some embodiments of any of the above methods, said decompressing is based on side information included with the metadata stream, the side information characterizing at least one of quantization and arithmetic coding of the sets of coefficients of the plurality of second TPB models.

In some embodiments of any of the above methods, the plurality of second TPB models includes a plurality of luma-channel TPB models and a plurality of chroma-channel TPB models.

In some embodiments of any of the above methods, the spatial reshaping function is configured to shift a nonuniform distribution of local content complexity in the source image toward being more uniform.

In some embodiments of any of the above methods, a two-dimensional standard deviation is a measure of the local content complexity.

According to yet another example embodiment disclosed above, e.g., in the summary section and/or in reference to any one or any combination of some or all of FIGS. 1-8, provided is an apparatus for image decompression, the apparatus comprising: at least one processor; and at least one memory including program code, wherein the at least one memory and the program code are configured to, with the at least one processor, cause the apparatus at least to: receive a metadata stream including first metadata representing a set of coefficients of a first tensor product B-spline (TPB) model and second metadata representing sets of coefficients of a plurality of second TPB models, the first TPB model approximating a spatial reshaping function configured to map uniformly sampled locations within a source image to non-uniformly spaced positions, each of the second TPB models representing a respective patch of the source image and configured to estimate an image signal within the respective patch as a function of reshaped coordinate, the reshaped coordinate being determined using the spatial reshaping function; generate a plurality of reconstructed image patches based on the first TPB model and further based on the plurality of second TPB models, the first TPB model being reconstructed using the first metadata, the plurality of second TPB models being reconstructed using the second metadata; and construct an estimated image by assembling the plurality of reconstructed image patches in an image frame.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments incorporate more features than are expressly recited in each claim. Rather, as the following claims reflect, inventive subject matter lies in fewer than all features of a single disclosed embodiment. Thus, the following claims are hereby incorporated into the Detailed Description, with each claim standing on its own as a separately claimed subject matter.

While this disclosure includes references to illustrative embodiments, this specification is not intended to be construed in a limiting sense. Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

Some embodiments may be implemented as circuit-based processes, including possible implementation on a single integrated circuit.

Some embodiments can be embodied in the form of methods and apparatuses for practicing those methods. Some embodiments can also be embodied in the form of program code recorded in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the patented invention(s). Some embodiments can also be embodied in the form of program code, for example, stored in a non-transitory machine-readable storage medium including being loaded into and/or executed by a machine, wherein, when the program code is loaded into and executed by a machine, such as a computer or a processor, the machine becomes an apparatus for practicing the patented invention(s). When implemented on a general-purpose processor, the program code segments combine with the processor to provide a unique device that operates analogously to specific logic circuits.

Unless explicitly stated otherwise, each numerical value and range should be interpreted as being approximate as if the word "about" or "approximately" preceded the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

Unless otherwise specified herein, in addition to its plain meaning, the conjunction "if" may also or alternatively be construed to mean "when" or "upon" or "in response to determining" or "in response to detecting," which construal may depend on the corresponding specific context. For example, the phrase "if it is determined" or "if [a stated condition] is detected" may be construed to mean "upon determining" or "in response to determining" or "upon detecting [the stated condition or event]" or "in response to detecting [the stated condition or event]."

As used herein in reference to an element and a standard, the term compatible means that the element communicates with other elements in a manner wholly or partially specified by the standard and would be recognized by other elements as sufficiently capable of communicating with the other elements in the manner specified by the standard. The compatible element does not need to operate internally in a manner specified by the standard.

The functions of the various elements shown in the figures, including any functional blocks labeled as "processors" and/or "controllers," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and nonvolatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

As used in this application, the terms "circuit," "circuitry" may refer to one or more or all of the following: (a) hardware-only circuit implementations (such as implementations in only analog and/or digital circuitry); (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

"BRIEF SUMMARY OF SOME SPECIFIC EMBODIMENTS" in this specification is intended to introduce some example embodiments, with additional embodiments being described in "DETAILED DESCRIPTION" and/or in reference to one or more drawings. "BRIEF SUMMARY OF SOME SPECIFIC EMBODIMENTS" is not intended to identify essential elements or features of the claimed subject matter, nor is it intended to limit the scope of the claimed subject matter.

APPENDIX: TENSOR-PRODUCT B-SPLINE (TPB) CONCEPTS

A B-Spline possesses a property for approximating a given curve or a segment thereof using a polynomial with a continuity constraint of a specific order. B-Splines can be used in a regression process by performing data fitting on top of a B-Spline model. To capture a relatively high dimensionality of multiple input variables in video processing, a tensor-product B-Spline (TPB) can be constructed by multiplying multiple B-Spline functions. Additionally, optionally, or alternatively, TPB can be used to provide continuous curves by its nature (with its inherent ability to ensure continuity up to a specific order), thereby avoiding or significantly reducing curve fitting operations after initial generation of predictions, transformations and/or mappings. For example, computationally intensive polynomial approximation algorithms to ensure continuity in multiple polynomial pieces as applied to the single-channel luminance predictor can be reduced or avoided with TPB techniques.

In this section, we first introduce the B-Spline for single variable (channel). Then, we extend the idea to multiple variables (channels) as tensor-product B-Spline. As an illustration, we discuss how to use tensor-product B-Spline in the prediction process, such as SDR to EDR or EDR to SDR.

B-Spline basis functions are constructed from piecewise polynomials that are fused smoothly at the knots to achieve the desired smoothness constraints. A B-Spline basis function consists of $(l+1)$ polynomial pieces of degree $l$, which are joined in an $(l-1)$ times continuously differentiable way. Using the complete basis, the function $f(z)$ can be represented through a linear combination of $D=T+l-1$ basis functions (T is the number of knots) as follows:

$$f(z) = \sum_{t=0}^{D-1} m_t B_t(z) \tag{A1}$$

Note that the B-Spline is only positive on an interval based on l+2 knots.

The $0^{th}$ order of B-Spline is defined as $$B_t^0(z) = I(k_t \leq z < k_{t+1}) = \begin{cases} 1 & k_t \leq z < k_{t+1} \\ 0 & \text{otherwise} \end{cases} \quad t = 0, \ldots, D-2 \quad \text{(A2)}$$

The higher order of B-Spline is defined recursively as $$B_t^l(z) = \frac{z - k_{t-1}}{k_t - k_{t-1}} B_{t-1}^{l-1}(z) + \frac{k_{t+1} - z}{k_{t+1} - k_{t+1-l}} B_t^{l-1}(z) \quad \text{(A3)}$$

Note that we need 2l outer knots outside [a, b] (as exterior knots) in addition to interior knots $k_0, k_1, \ldots, k_{T-1}$.

FIGS. 8A-8D are graphs illustrating sets of $0^{th}$ to $3^{rd}$ order B-Spline basis functions for a uniform distribution of knot points according to one example. If we have T=8 knots and use the $2^{nd}$ order B-Spline, then we will have D=9 basis functions and 9 coefficients {m,} to determine such that a 1D curve can be approximated. We can apply the B-Spline in the regression scenario, for example for the EDR↔SDR prediction.

Suppose we have P pixels in one picture. Let the triplets $$\left( s_{ji}^y, s_{ji}^{c0}, s_{ji}^{c1} \right) \text{ and } \left( v_{ji}^y, v_{ji}^{c0}, v_{ji}^{c1} \right)$$

represent the normalized Y, $C_0$ and $C_1$ values for $i^{th}$ pixel in the $j^{th}$ SDR and EDR frame respectively. For the single channel predictor, considering the luma channel, we would like to predict $$s_{ji}^y$$

from $$v_{ji}^y.$$

With a set of selected knot points, which construct the required $D^y$ (=T+l−1) basis functions, $$B_{j,t}^y(),$$

we can have the prediction using coefficients $$\{m_{j,t}^y\}$$

as $$\hat{s}_{ji}^y = f_j^y\left(v_{ji}^y\right) = \sum_{t=0}^{D^y-1} m_{j,t}^y B_{j,t}^y\left(v_{ji}^y\right) \quad \text{(A4)}$$

Having P pixels, we can put all values into the matrix form to predict the new values $$\hat{s}_j^y = S_j^y m_j^y \quad \text{(A5)}$$

where $$\hat{s}_j^y = \begin{bmatrix} \hat{s}_{j0}^y \\ \hat{s}_{j1}^y \\ \vdots \\ \hat{s}_{j,P-1}^y \end{bmatrix} \quad \text{(A6)}$$

$$m_j^y = \begin{bmatrix} m_{j,0}^y \\ m_{j,1}^y \\ \vdots \\ m_{j,D^y-1}^y \end{bmatrix} \quad \text{(A7)}$$

$$S_j^y = \begin{bmatrix} B_{j,0}^y(v_{j0}^y) & B_{j,1}^y(v_{j0}^y) & \cdots & B_{j,D^y-1}^y(v_{j0}^y) \\ B_{j,0}^y(v_{j1}^y) & B_{j,1}^y(v_{j1}^y) & \cdots & B_{j,D^y-1}^y(v_{j1}^y) \\ \vdots & \vdots & & \vdots \\ B_{j,0}^y(v_{j,P-1}^y) & B_{j,1}^y(v_{j,P-1}^y) & \cdots & B_{j,D^y-1}^y(v_{j,P-1}^y) \end{bmatrix} \quad \text{(A8)}$$

Denote the ground truth vector as follows:

$$s_j^y = \begin{bmatrix} s_{j0}^y \\ s_{j1}^y \\ \vdots \\ s_{j,P-1}^y \end{bmatrix} \quad \text{(A9)}$$

An optimal solution of $$m_j^y$$

can be obtained via the least squares solution:

$$m_j^{y,opt} = \left( (S_j^y)^T S_j^y \right)^{-1} \left( (S_j^y)^T s_j^y \right) \quad \text{(A10)}$$

Note that solving this least-squares problem needs special care because the matrix $$S_j^y$$

is sparse. If the knot points are fixed regardless of what kind of signal distribution there is, we might have empty pixels in some knot intervals. Because the basis function is only positive over a small interval and zero outside the interval, those empty intervals will contribute to some all zero columns in $$S_j^y.$$

Those all zero columns will make ill-defined conditions for the matrix $$\left(S_j^y\right)^T S_j^y.$$

A solution to this problem is to remove the columns which have small value in $$S_j^y$$

and set the corresponding coefficients as 0s.

Denote each element in $$S_j^y \text{ as } S_j^y(\alpha, \beta)$$

and the $\alpha^{th}$ column as $$S_j^y(\alpha, :)$$

---

$$\tilde{S}_j^y = 0_{P \times 0}$$

$$\Phi_j^y = \{\,\}$$

$c = 0;$

For each column, $\alpha$, in $S_j^y$

// sum up the value of each element in the $\alpha^{th}$ column $$U_\alpha = \sum_{\beta=0}^{P-1} S_j^y(\alpha, \beta)$$

// retain the column if the sum is bigger than a threshold
  // add to new matrix
  If($U_\alpha > \delta$)

$$\tilde{S}_j^y = \left[\, \tilde{S}_j^y \quad S_j^y(\alpha, :) \,\right]$$

$$\Phi_j^y = \Phi_j^y \cup \alpha$$

c ++
  end
end

---

We will use $$\tilde{S}_j^y$$

to solve the least squares problem.

$$\tilde{m}_j^{y,opt} = \left(\left(\tilde{S}_j^y\right)^T \tilde{S}_j^y\right)^{-1} \left(\left(\tilde{S}_1^y\right)^T s_j^y\right) \tag{A11}$$

Since we have removed several columns ($D^y - c$), the optimal solution lacks several parameters. We will put back the optimal vector, and the removed ($D^y - c$) positions will be filled with 0.

$$m_j^{y,opt}\left(\Phi_j^y\right) = \tilde{m}_j^{y,opt} \tag{A12}$$

---

For $\alpha = 0 : 1 : D^y - 1$

If($\alpha$ is in $\Phi_j^y$)

Find corresponding index $\alpha'$ in $\Phi_j^y$ for a given $\alpha$ $$m_j^{y,opt}(\alpha) = \tilde{m}_j^{y,opt}(\alpha')$$

else $$m_j^{y,opt}(\alpha) = 0$$

end
end

---

In the previous discussion, we assume that the locations of the knot points are given. Note that the location of the knot points $\{k_t\}$ also affects the optimization result. In other words, the optimal solution is obtained by determining the location of the knot points $\{k_t\}$ and the coefficients $$\{m_{j,t}^y\}.$$

Although selecting optimal knot points can further improve the performance, setting uniformly distributed knot points is advantageous for: (1) not sending the metadata to indicate the knot locations to reduce the bitstream overhead, and (2) not re-computing the basis function once knot points are changed frame by frame at the decoder side. In other words, the basis function is fixed and can be hard wired at the decoder side to reduce the computation load and hardware complexity.

It is observed that there is a limitation for the EDR$\leftarrow\rightarrow$SDR mapping using a single-channel predictor. The mapping problem that we face is in a 3-D space and we only exploit the 1-D function to map one single-channel. As we know, the EDR$\leftarrow\rightarrow$SDR mapping involves cross-color operations, such as color transform and saturation control. In other words, using a 1-D predictor in such a scenario has significant limitations.

To improve the performance, we rely on known solutions for the cross-color channel predictor, such as MMR in Dolby Vision 1.0, to explore the cross-color channel relationship. In some examples, we apply the tensor-product B-Spline (TPB) to implement the cross-color channel prediction. Since the MMR used in Dolby Vision 1.0 is a global mapping operator, and TPB can model the mapping in each local partition, the TPB can outperform MMR owing to TPB's flexibility to model the local mappings.

Take the prediction for the luma channel as an example. We need three independent basis functions in each dimension. In this case, we have $$D_0^y, D_1^y, \text{ and } D_2^y$$

basis functions along Y, $C_0$, and $C_1$ dimensions. Denote $t^y$, $t^{c0}$, and $t^{c1}$ as the knot point index in Y, $C_0$, and $C_1$ dimensions. Given a set of knot points in three dimensions, we have three individual basis function sets:

$$B_{j,t^y}^{y,0}\left(v_{ji}^y\right), B_{j,t^{c0}}^{y,1}\left(v_{ji}^{c0}\right), \text{ and } B_{j,t^{c1}}^{y,2}\left(v_{ji}^{c1}\right).$$

The tensor-product B-Spline basis function for predicting luma channel can be constructed by multiplying all 3 channels together as:

$$B_{j,t^y,t^{c0},t^{c1}}^{TPB,y}\left(v_{ji}^y, v_{ji}^{c0}, v_{ji}^{c1}\right) = B_{j,t^y}^{y,0}\left(v_{ji}^y\right) \cdot B_{j,t^{c0}}^{y,1}\left(v_{ji}^{c0}\right) \cdot B_{j,t^{c1}}^{y,2}\left(v_{ji}^{c1}\right) \quad (A13)$$

The cross-channel prediction can be performed as:

$$\hat{s}_{ji}^y = f_j^{TPB,y}\left(v_{ji}^y, v_{ji}^{c0}, v_{ji}^{c1}\right) = \quad (A14)$$

$$\sum_{t^y=0}^{D_0^y-1}\sum_{t^{c0}=0}^{D_1^y-1}\sum_{t^{c1}=0}^{D_2^y-1} m_{j,t^y t^{c0},t^{c1}}^{TPB,y} \cdot B_{j,t^y,t^{c0},t^{c1}}^{TPB,y}\left(v_{ji}^y, v_{ji}^{c0}, v_{ji}^{c1}\right)$$

By vectorizing the 3D index (i.e., $t^y$, $t^{c0}$, and $t^{c1}$) to become a 1D index (i.e., t), we can simplify the expressions. For example, for the basis function, we have:

$$B_{j,t}^{TPB,y}\left(v_{ji}^y, v_{ji}^{c0}, v_{ji}^{c1}\right) \equiv B_{j,t^y,t^{c0},t^{c1}}^{TPB,y}\left(v_{ji}^y, v_{ji}^{c0}, v_{ji}^{c1}\right) \quad (A15)$$

With $$D^y = D_0^y \cdot D_1^y \cdot D_2^y,$$

the prediction is expressed as:

$$\hat{s}_{ji}^y = f_j^{TPB,y}\left(v_{ji}^y, v_{ji}^{c0}, v_{ji}^{c1}\right) = \sum_{t=0}^{D^y-1} m_{j,t}^{TPB,y} \cdot B_{j,t}^{TPB,y}\left(v_{ji}^y, v_{ji}^{c0}, v_{ji}^{c1}\right) \quad (A15)$$

With all P pixels in one frame, we can construct the design matrix $$S_j^{TPB,y} = \begin{bmatrix} B_{j,0}^{TPB,y}\left(v_{j0}^y, v_{j0}^{c0}, v_{j0}^{c1}\right) & B_{j,1}^{TPB,y}\left(v_{j0}^y, v_{j0}^{c0}, v_{j0}^{c1}\right) & \cdots & B_{j,D^y-1}^{TPB,y}\left(v_{j0}^y, v_{j0}^{c0}, v_{j0}^{c1}\right) \\ B_{j,0}^{TPB,y}\left(v_{j1}^y, v_{j1}^{c0}, v_{j1}^{c1}\right) & B_{j,1}^{TPB,y}\left(v_{j1}^y, v_{j1}^{c0}, v_{j1}^{c1}\right) & \cdots & B_{j,D^y-1}^{TPB,y}\left(v_{j1}^y, v_{j1}^{c0}, v_{j1}^{c1}\right) \\ \vdots & \vdots & & \vdots \\ B_{j,0}^{TPB,y}\left(v_{j,P-1}^y, v_{j,P-1}^{c0}, v_{j,P-1}^{c1}\right) & B_{j,1}^{TPB,y}\left(v_{j,P-1}^y, v_{j,P-1}^{c0}, v_{j,P-1}^{c1}\right) & \cdots & B_{j,D^y-1}^{TPB,y}\left(v_{j,P-1}^y, v_{j,P-1}^{c0}, v_{j,P-1}^{c1}\right) \end{bmatrix} \quad (A16)$$

The prediction coefficients can be expressed as a vector:

$$m_j^{TPB,y} = \begin{bmatrix} m_{j,0}^{TPB,y} \\ m_{j,1}^{TPB,y} \\ \vdots \\ m_{j,D^y-1}^{TPB,y} \end{bmatrix} \quad (A17)$$

Then, the prediction can be expressed as:

$$\hat{s}_j^y = S_j^{TPB,y} m_j^{TPB,y} \quad (A18)$$

An optimal solution of $$m_j^{TPB,y}$$

can be obtained via the least squares method as:

$$m_j^{TPB,y,(opt)} = \left(\left(S_j^{TPB,y}\right)^T S_j^{TPB,y}\right)^{-1}\left(\left(S^{TPB,y}\right)^T s_j^y\right) \quad (A19)$$

What is claimed is:

1. An image-compression method, comprising:
generating, with an electronic encoder, a first tensor product B-spline "TPB" model representing an image, the first TPB model approximating a spatial domain coordinate reshaping function configured to shift a non-uniform distribution of local content complexity in the image toward a more uniform distribution of local content complexity;

generating, with the electronic encoder, a plurality of second TPB models, each of the second TPB models representing a respective patch of the image, wherein each of the second TPB models provide an estimate of an image signal within the respective patch as a function of reshaped coordinate, the reshaped coordinate being determined using the spatial domain coordinate reshaping function; and generating, with the electronic encoder, a metadata stream including first metadata representing a set of coefficients of the first TPB model and second metadata representing sets of coefficients of the plurality of second TPB models.

2. The image-compression method of claim 1, wherein the reshaped coordinate is normalized to be in a range [0 1].

3. The image-compression method of claim 1, wherein generating the second metadata comprises compressing, with the electronic encoder, the sets of coefficients of the plurality of second TPB models.

4. The image-compression method of claim 3, wherein said compressing comprises:

generating quantized sets of coefficients by quantizing each coefficient to a smaller number of bits; and applying entropy coding to the quantized sets of coefficients.

5. The image-compression method of claim 4, wherein the entropy coding comprises arithmetic coding; and wherein the metadata stream includes side information characterizing at least one of the quantizing and the arithmetic coding.

6. The image-compression method of claim 4, wherein said quantizing comprises applying nonlinear quantization to the coefficients of the plurality of second TPB models.

7. The image-compression method of claim 1, further comprising partitioning the image, with the electronic encoder, into a plurality of nonoverlapping patches, wherein each respective patch is selected from the plurality of nonoverlapping patches.

8. The image-compression method of claim 1, wherein the image is a YCbCr image; and wherein the method further comprises generating the YCbCr image by applying RGB-to-YCbCr conversion to an RGB image.

9. The image-compression method of claim 1, wherein the plurality of second TPB models includes a plurality of luma-channel TPB models and a plurality of chroma-channel TPB models.

10. The image-compression method of claim 1, wherein a two-dimensional standard deviation is a measure of the local content complexity.

11. The image-compression method of claim 1, wherein said generating the plurality of second TPB models comprises, for a second TPB model from the plurality of second TPB models, finding a respective set of coefficients that causes a difference between the image signal and an estimate of the image signal in the respective patch to be approximately minimized, the estimate of the image signal being computed using the second TPB model.

12. The image-compression method of claim 11, wherein said finding is based on least squares minimization.

13. The image-compression method of claim 1, further comprising transmitting the metadata stream, via a communication channel, to an electronic decoder.

14. The image-compression method of claim 1, further comprising performing rate-distortion optimization to select one or more parameters from the group consisting of a patch size, a number of basis functions, and a number of bits for a quantized TPB coefficient.

15. The image-compression method of claim 14, wherein the rate-distortion optimization is based on a greedy algorithm.

16. The image-compression method of claim 1, wherein the spatial reshaping function is a normalized cumulative function of local standard deviation computed via a process of standard deviation equalization.

17. A non-transitory computer-readable medium storing instructions that, when executed by an electronic processor, cause the electronic processor to perform operations comprising the method of claim 1.

18. An apparatus for image compression, the apparatus comprising:

at least one processor; and at least one memory including program code, wherein the at least one memory and the program code are configured to, with the at least one processor, cause the apparatus at least to:

generate a first tensor product B-spline (TPB) model representing an image, the first TPB model approximating a spatial domain coordinate reshaping function configured shift a non-uniform distribution of local content complexity in the image toward a more uniform distribution of local content complexity;

generate a plurality of second TPB models, each of the second TPB models representing a respective patch of the image, wherein each of the second TPB models provide an estimate of an image signal within the respective patch as a function of reshaped coordinate, the reshaped coordinate being determined using the spatial domain coordinate reshaping function; and generate a metadata stream including first metadata representing a set of coefficients of the first TPB model and second metadata representing sets of coefficients of the plurality of second TPB models.

19. The apparatus of claim 18, wherein the reshaped coordinate is normalized to be in a range [0 1].

20. An image-decompression method, comprising:

receiving, with an electronic decoder, a metadata stream including first metadata representing a set of coefficients of a first tensor product B-spline "TPB" model and second metadata representing sets of coefficients of a plurality of second TPB models, the first TPB model approximating a spatial domain coordinate reshaping function configured to shift a non-uniform distribution of local content complexity in a source image toward a more uniform distribution of local content complexity, each of the second TPB models representing a respective patch of the source image and providing an estimate of an image signal within the respective patch as a function of reshaped coordinate, the reshaped coordinate being determined based on the spatial domain coordinate reshaping function;

generating, with the electronic decoder, a plurality of reconstructed image patches based on the first TPB model and further based on the plurality of second TPB models, the first TPB model being reconstructed using the first metadata, the plurality of second TPB models being reconstructed using the second metadata; and constructing, with the electronic decoder, an estimated image by assembling the plurality of reconstructed image patches in an image frame.

21. The image-decompression method of claim 20, wherein the reshaped coordinate is normalized to be in a range [0 1].

22. The image-decompression method of claim 20, further comprising decompressing the second metadata, with the electronic decoder, to reconstruct the sets of coefficients of the plurality of second TPB models.

23. The image-decompression method of claim 22, wherein said decompressing is based on side information included with the metadata stream, the side information characterizing at least one of quantization and arithmetic coding of the sets of coefficients of the plurality of second TPB models.

24. The image-decompression method of claim 20, wherein the plurality of second TPB models includes a plurality of luma-channel TPB models and a plurality of chroma-channel TPB models.

25. The image-decompression method of claim 20, wherein a two-dimensional standard deviation is a measure of the local content complexity.

26. A non-transitory computer-readable medium storing instructions that, when executed by an electronic processor, cause the electronic processor to perform operations comprising the method of claim 20.

27. An apparatus for image decompression, the apparatus comprising:

at least one processor; and at least one memory including program code, wherein the at least one memory and the program code are configured to, with the at least one processor, cause the apparatus at least to:

receive a metadata stream including first metadata representing a set of coefficients of a first tensor product B-spline (TPB) model and second metadata represent-
ing sets of coefficients of a plurality of second TPB
models, the first TPB model approximating a spatial
domain coordinate reshaping function configured to
shift a non-uniform distribution of local content complexity in a source image toward a more uniform
distribution of local content complexity, each of the
second TPB models representing a respective patch of
the source image and providing an estimate of an image
signal within the respective patch as a function of
reshaped coordinate, the reshaped coordinate being
determined using the spatial domain coordinate reshap-
ing function;
generate a plurality of reconstructed image patches based
on the first TPB model and further based on the
plurality of second TPB models, the first TPB model
being reconstructed using the first metadata, the plu-
rality of second TPB models being reconstructed using
the second metadata; and
construct an estimated image by assembling the plurality
of reconstructed image patches in an image frame.

28. The apparatus of claim 27, wherein the reshaped
coordinate is normalized to be in a range [0 1].

\* \* \* \* \*